(12) United States Patent
Zlatanchev et al.

(10) Patent No.: US 10,528,389 B2
(45) Date of Patent: Jan. 7, 2020

(54) METHOD AND APPARATUS FOR EXECUTING REAL-TIME TASKS

(71) Applicant: ESG Elektroniksystem- und Logistik-GmbH, Fürstenfeldbruck (DE)

(72) Inventors: Ivan Zlatanchev, Fürstenfeldbruck (DE); Tillmann Heidsieck, Fürstenfeldbruck (DE)

(73) Assignee: ESG ELEKTRONIKSYSTEM—UND LOGISTIK-GMBH, Fürstenfeldbruck (DE)

( * ) Notice: Subject to any disclaimer, the term of this patent is extended or adjusted under 35 U.S.C. 154(b) by 77 days.

(21) Appl. No.: 15/706,265

(22) Filed: Sep. 15, 2017

(65) Prior Publication Data

US 2018/0081720 A1 Mar. 22, 2018

(30) Foreign Application Priority Data

Sep. 18, 2016 (EP) .................... 16189369

(51) Int. Cl.
*G06F 9/46* (2006.01)
*G06F 9/48* (2006.01)
*G06F 11/34* (2006.01)

(52) U.S. Cl.
CPC .......... *G06F 9/4887* (2013.01); *G06F 9/4881* (2013.01); *G06F 11/3476* (2013.01);
(Continued)

(58) Field of Classification Search
CPC .. G06F 9/4881; G06F 9/4887; G06F 11/3476; G06F 2201/81; G06F 2201/865; G06F 2201/885
(Continued)

(56) References Cited

U.S. PATENT DOCUMENTS 6,092,095 A * 7/2000 Maytal .................. G06F 9/4887
718/100
9,697,020 B2 * 7/2017 Maclay .................. G06F 9/455
(Continued)

OTHER PUBLICATIONS

Ekelin et al., "Real-Time System Constraints: Where do They Come From and Where do They Go?", 1999, In Proceedings of the Int'l Workshop on Real-Time Constraints, Oct. 16, 1999, Alexandria, Virginia, USA, 5 pages (Year: 1999).*
(Continued)

*Primary Examiner* — Ted T. Vo
(74) *Attorney, Agent, or Firm* — McDermott Will & Emery LLP

(57) ABSTRACT

An apparatus and a method are presented for executing a program including a plurality of tasks, wherein one or more tasks of the plurality of tasks have real-time constraints, the method comprising the following steps for each task with real-time constraints: determining a real-time reference model for the task, wherein the real-time reference model of a task includes a plurality of micro tasks which are a partitioning of the task and an order among the micro tasks according to all possible execution paths of the task, and wherein the reference model includes a reference timing for each micro task; executing the task and a plurality of other tasks and determining after execution of a micro task of the task an actual timing, comparing the actual timing to the reference timing, and based on the comparing increasing the priority of the task.

13 Claims, 19 Drawing Sheets

(52) U.S. Cl.
CPC .... *G06F 2201/81* (2013.01); *G06F 2201/865* (2013.01); *G06F 2201/885* (2013.01)

(58) Field of Classification Search
USPC .......... 717/127, 131, 160–161; 718/103, 107
See application file for complete search history.

(56) References Cited

U.S. PATENT DOCUMENTS

| | | | |
|---|---|---|---|
| 2009/0307700 A1* | 12/2009 | Cazorla Almeida | G06F 9/4887 718/103 |
| 2015/0074674 A1 | 3/2015 | Ma et al. | |
| 2016/0274939 A1* | 9/2016 | Chandhoke | G06F 9/4887 |

OTHER PUBLICATIONS

Ashamalla et al., "Real-Time Task Attributes and Temporal Constraints", 2014, Twentieth Americas Conference on Information Systems, Savannah, 11 pages (Year: 2014).*

Extended European Search Report issued for EP16189369.8 dated Mar. 21, 2017 (10 pages).

Pagetti et al., "Runtime monitoring of time-critical tasks in multi-core systems", Dagstuhl Seminar 15121, Mar. 15, 2015 (10 pages).

Paulitsch, "Challenges for the use of multicore processors in mixed-criticailty systems with focus on temporal aspects", RTAS 2014, Apr. 16, 2014 (13 pages).

Pagetti et al. "Runtime monitoring of time-critical tasks in multi-core systems." Conference on Real-Time and Network Systems (RTNS'14). 2014.

* cited by examiner

FIG. 10

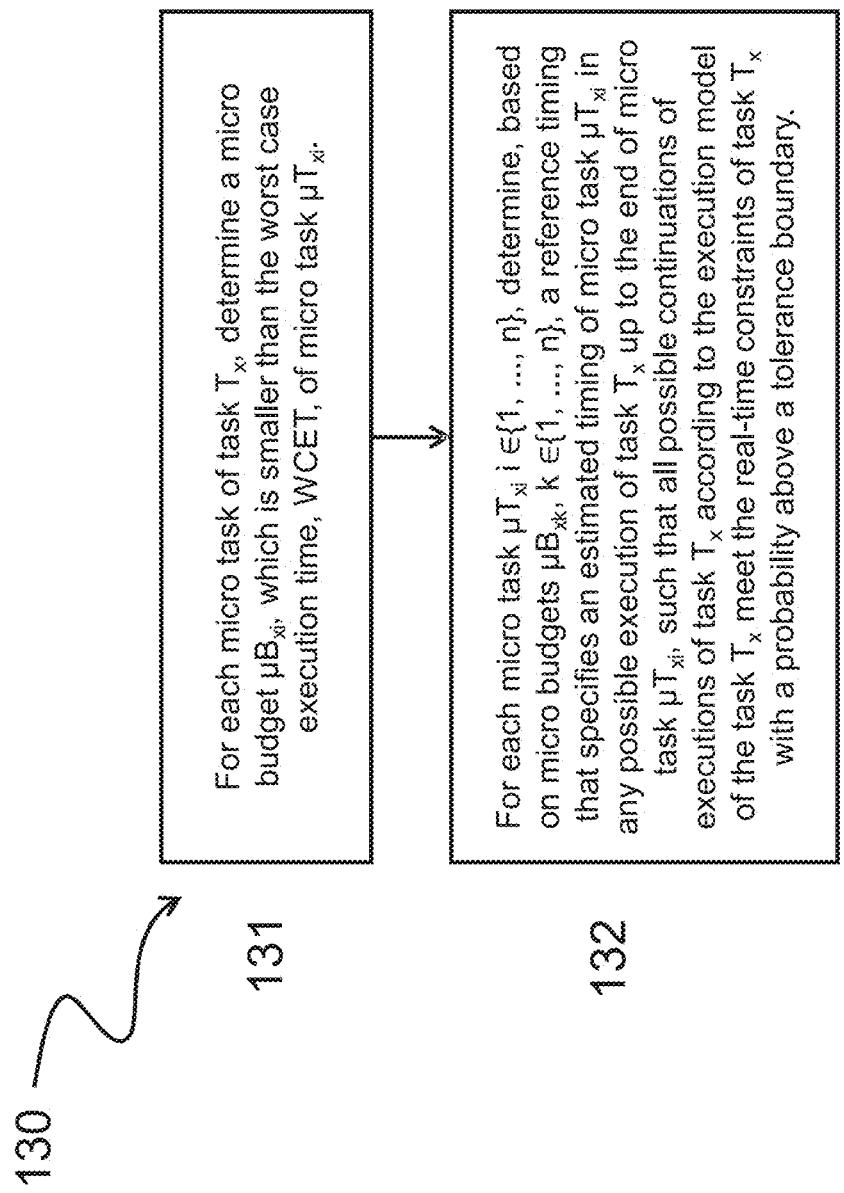

131: For each micro task of task $T_x$, determine a micro budget $\mu B_{xi}$, which is smaller than the worst case execution time, WCET, of micro task $\mu T_{xi}$.

132: For each micro task $\mu T_{xi}$, $i \in \{1, ..., n\}$, determine, based on micro budgets $\mu B_{xk}$, $k \in \{1, ..., n\}$, a reference timing that specifies an estimated timing of micro task $\mu T_{xi}$ in any possible execution of task $T_x$ up to the end of micro task $\mu T_{xi}$, such that all possible continuations of executions of task $T_x$ according to the execution model of the task $T_x$ meet the real-time constraints of task $T_x$ with a probability above a tolerance boundary.

FIG. 14

| #ACP_eventsx | µB_xi | WCET (µTxi) | BT_xi | P(µB_xi) |
|---|---|---|---|---|
| total | 60 | 8 | 32 | 0.75 |
| Hard RT | 17 | | | |
| Soft RT | 43 | | | |

| | Actual CT(E_xi) | $\Delta s\_\mu T_{xi}$ | B_WCET$_{xi}$ | B_Soft$_{xi}$ | execution time ($\mu T\_xi$) | remaining soft-RT events | total events remaining on the ACP | residual probability of missing the deadline |
|---|---|---|---|---|---|---|---|---|
| 1 | 0 | 0 | 1016 | 368 | 8 | 42 | 59 | 3,00927E-36 |
| 2 | 8 | 0 | 1008 | 360 | 8 | 41 | 58 | 1,20371E-35 |
| 3 | 18 | 2 | 1002 | 354 | 8 | 40 | 57 | 4,81482E-35 |
| 4 | 29 | 3 | 995 | 347 | 8 | 39 | 56 | 1,92593E-34 |
| 5 | 33 | -4 | 980 | 332 | 8 | 38 | 55 | 7,70372E-34 |
| 6 | 39 | -2 | 974 | 326 | 8 | 37 | 54 | 3,08149E-33 |
| 7 | 48 | 1 | 969 | 321 | 8 | 36 | 53 | 1,2326E-32 |
| 8 | 57 | 1 | 961 | 313 | 8 | 35 | 52 | 4,93038E-32 |
| 9 | 67 | -3 | 949 | 301 | 8 | 34 | 51 | 1,97215E-31 |
| 10 | 68 | -2 | 942 | 294 | 8 | 33 | 50 | 7,88861E-31 |
| 11 | 75 | -1 | 935 | 287 | 8 | 32 | 49 | 3,15544E-30 |
| 12 | 85 | 2 | 930 | 282 | 8 | 31 | 48 | 1,26218E-29 |
| 13 | 93 | 0 | 920 | 272 | 8 | 30 | 47 | 5,04871E-29 |
| 14 | 101 | 0 | 912 | 264 | 8 | 29 | 46 | 2,01948E-28 |
| 15 | 114 | 5 | 909 | 261 | 8 | 28 | 45 | 8,07794E-28 |
| 16 | 119 | -3 | 893 | 245 | 8 | 27 | 44 | 3,23117E-27 |
| 17 | 125 | -2 | 886 | 238 | 8 | 26 | 43 | 1,29247E-26 |
| 18 | 134 | 1 | 881 | 233 | 8 | 25 | 42 | 5,16988E-26 |
| 19 | 142 | 0 | 872 | 224 | 8 | 24 | 41 | 2,06795E-25 |
| 20 | 150 | 0 | 864 | 216 | 8 | 23 | 40 | 8,27181E-25 |
| 21 | 153 | -5 | 851 | 203 | 8 | 22 | 39 | 3,30872E-24 |
| 22 | 162 | 1 | 849 | 201 | 8 | 21 | 38 | 1,32349E-23 |
| 23 | 173 | 3 | 843 | 195 | 8 | 20 | 37 | 5,29396E-23 |
| 24 | 179 | -2 | 830 | 182 | 8 | 19 | 36 | 2,11758E-22 |
| 25 | 191 | 4 | 828 | 180 | 8 | 18 | 35 | 8,47033E-22 |
| 26 | 201 | 2 | 818 | 170 | 8 | 17 | 34 | 3,38813E-21 |
| 27 | 210 | 1 | 809 | 161 | 8 | 16 | 33 | 1,35525E-20 |
| 28 | 218 | 0 | 800 | 152 | 8 | 15 | 32 | 5,42101E-20 |
| 29 | 227 | 1 | 793 | 145 | 8 | 14 | 31 | 2,1684E-19 |
| 30 | 237 | 2 | 786 | 138 | 8 | 13 | 30 | 8,67362E-19 |
| 31 | 245 | 0 | 776 | 128 | 8 | 12 | 29 | 3,46945E-18 |
| 32 | 256 | 3 | 771 | 123 | 8 | 11 | 28 | 1,38778E-17 |
| 33 | 260 | -4 | 756 | 108 | 8 | 10 | 27 | 5,55112E-17 |
| 34 | 271 | 3 | 755 | 107 | 8 | 9 | 26 | 2,22045E-16 |
| 35 | 281 | 2 | 746 | 98 | 8 | 8 | 25 | 8,88178E-16 |
| 36 | 288 | -1 | 735 | 87 | 8 | 7 | 24 | 3,55271E-15 |
| 37 | 296 | 0 | 728 | 80 | 8 | 6 | 23 | 1,42109E-14 |

Soft Real-Time

| (A) | 38 | 305 | 1 | 721 | 73 | 8 | 5 | 22 | 5,68434E-14 |
|---|---|---|---|---|---|---|---|---|---|
| | 39 | 315 | 2 | 714 | 66 | 8 | 4 | 21 | 2,27374E-13 |
| | 40 | 324 | 1 | 705 | 57 | 8 | 3 | 20 | 9,09495E-13 |
| | 41 | 332 | 0 | 696 | 48 | 8 | 2 | 19 | 3,63798E-12 |
| | 42 | 341 | 1 | 689 | 41 | 8 | 1 | 18 | 1,45519E-11 |
| | 43 | 349 | 0 | 680 | 32 | 8 | 0 | 17 | 5,82077E-11 |
| Hard Real-Time | 44 | 357 | 0 | 648 | 0 | 8 | 0 | 16 | 2,32831E-10 |
| | 45 | 365 | 0 | 608 | 0 | 8 | 0 | 15 | 9,31323E-10 |
| | 46 | 373 | 0 | 568 | 0 | 8 | 0 | 14 | 3,72529E-09 |
| | 47 | 381 | 0 | 528 | 0 | 8 | 0 | 13 | 1,49012E-08 |
| | 48 | 389 | 0 | 488 | 0 | 8 | 0 | 12 | 5,96046E-08 |
| | 49 | 397 | 0 | 448 | 0 | 8 | 0 | 11 | 2,38419E-07 |
| | 50 | 405 | 0 | 408 | 0 | 8 | 0 | 10 | 9,53674E-07 |
| | 51 | 413 | 0 | 368 | 0 | 8 | 0 | 9 | 3,8147E-06 |
| | 52 | 421 | 0 | 328 | 0 | 8 | 0 | 8 | 1,52588E-05 |
| | 53 | 429 | 0 | 288 | 0 | 8 | 0 | 7 | 6,10352E-05 |
| | 54 | 437 | 0 | 248 | 0 | 8 | 0 | 6 | 0,000244141 |
| | 55 | 445 | 0 | 208 | 0 | 8 | 0 | 5 | 0,000976563 |
| | 56 | 453 | 0 | 168 | 0 | 8 | 0 | 4 | 0,00390625 |
| | 57 | 461 | 0 | 128 | 0 | 8 | 0 | 3 | 0,015625 |
| | 58 | 469 | 0 | 88 | 0 | 8 | 0 | 2 | 0,0625 |
| | 59 | 477 | 0 | 48 | 0 | 8 | 0 | 1 | 0,25 |
| | 60 | 485 | 0 | 8 | 0 | 8 | 0 | 0 | 1 |

FIG. 15(b)

METHOD AND APPARATUS FOR EXECUTING REAL-TIME TASKS

CROSS-REFERENCE TO RELATED APPLICATIONS

This application claims priority to European Application No. 16189369 filed on Sep. 18, 2016, which is incorporated herein by reference in its entirety and made a part thereof.

FIELD OF THE INVENTION

The present invention concerns a method and apparatus for executing a plurality of tasks under real-time constraints.

BACKGROUND

A program specifies a computation.

A real-time program specifies a computation of one or more tasks that have real-time constraints.

A task is a portion of a computation of a program.

A real-time constraint specifies that the computation of a task must have progressed up to a certain point, which could for example be the end of the task, within a predefined duration in wall clock time. The predefined duration in time is also known as the time between the activation of a task and a deadline of a task.

When the real-time program is executed, a plurality of tasks specified by the program may execute concurrently.

One or more real-time tasks may execute concurrently with tasks that do not have real-time constraints. The latter tasks are also referred to as non-real-time tasks (non-RT tasks).

A real-time task (RT-task) typically executes on the same execution unit from the start of said task to the end of said task.

When a plurality of tasks execute on the same execution unit, concurrent execution means that the plurality of tasks use the execution unit in a time sharing manner. Time sharing refers to the allocation of each task of the concurrent tasks to the execution unit. Time sharing is controlled by a scheduler. The scheduler may be a hardware or software scheduler or a combination thereof. Preferably the scheduler is controlled by the operating system. The operating system is preferably a real-time operating system.

When referring to "time" in the context of real-time computations, two different concepts are distinguished: The first concept of "time" concerns "execution time," sometimes also referred to as "CPU time," which refers to the time that a task actually makes use of an execution unit. The second concept of "time" concerns "wall clock time." Likewise, the term "duration" refers to wall clock time, which is the difference between an end point and a start point in wall clock time. For example, the start of a task and the deadline of a task are typically specified as absolute or relative points in wall clock time, i.e., in wall clock times. The wall clock time between the activation time of a task and its end is also referred to as "response time". When the execution unit is not shared among a plurality of tasks, only a single task is allocated to the execution unit, the concepts of "wall clock time" and "execution time" are identical under the assumption that the single task is always active. A task is active if it is ready to execute, i.e., if it is not waiting, e.g., for input which may, e.g., be provided by other tasks. When it is clear from the context, the wording in the following uses the term "time", otherwise it is explicitly distinguished between "execution time" and "wall clock time".

Similar to sharing of the execution unit, other resources may be shared among concurrent tasks wherein sharing is likewise controlled by a resource allocator which may be a unit of an operating system. The present disclosure and the techniques presented herein primarily relate to the sharing of the execution units wherein the resource allocator is a scheduler. When sharing concerns resources other than an execution unit, this is explicitly mentioned herein. The following terms are typically used in the real-time theory: "active resource" refers, e.g., to an execution unit or communication bus; "passive resource" refers, e.g., to variables or memory shared among different OS threads.

An execution unit is typically a processor core. Modern processors typically include a plurality of cores and are thus called multi-core or many-core processors. The architecture of such processors is commonly such that the cores share common resources on the processor, for example a cache, a communication bus, and a memory interface. This type of sharing due to the architecture of a multicore-processor has the effect that the execution of a first task on a first core may affect the timing of an execution of a second task on a second execution core.

For real-time programs, this type of resource sharing based on the processor architecture affects the prediction of the worst-case execution time. Specifically, the worst case execution time, WCET, which is an execution time in the above sense and which is predicted by conventional methods that take into account any possible and specifically also extremely unlikely interactions among processor cores through their sharing of architectural resources, may lead to extremely pessimistic WCET predictions that are much above realistic common case execution times. This large discrepancy makes the prediction results of WCET determined by conventional methods of little use on multicore architecture, since, when provided as input to a scheduler, lead to very pessimistic real-time schedules that do not achieve efficient resource utilization. While the problem is particularly relevant for multicore architectures as described, resource sharing also occurs when multiple concurrent tasks execute in a time-sharing manner on a processor with a single execution unit, which is e.g. a processor core, since, for example, the cache memory associated with the execution unit is shared among the concurrent tasks.

Claire Pagetti, Christine Rochange: "*Runtime monitoring of time-critical tasks in multicore systems*" (available at materials.dagstuhl.de/files/15/15121/15121.ClairePagetti.ExtendedAbstract. pdf) describes a method which monitors critical tasks at run time, wherein in case of a delay and thus a possible violation of real-time properties, other less critical tasks are interrupted to allow the critical task to continue its execution in a timely and efficient manner, without sharing resources of the execution unit with other tasks.

Michael Paulitsch: "*Challenges for the Use of Multicore Processors in Mixed-Criticality Systems with Focus on Temporal Aspects*", RTAS 2014 (available at: 2014.rtas.org/wp-content/uploads/Paulitsch.pdf). Slide number 11: "WCET for *Multi-Core Computers Combined with Monitoring*" describes the possibility to execute tasks with real-time constraints on multicore processors.

To summarize the aforementioned problem, the high discrepancy between predicted WCET and common case execution times on modern processor architectures makes conventional techniques of WCET inefficient to control real-time execution and scheduling decisions on such architectures. The present disclosure addresses this problem.

SUMMARY OF THE INVENTION

The present invention is concerned with a method for executing a program including a plurality of tasks, wherein one or more tasks of the plurality of tasks have real-time constraints, the method comprising the following steps for each task Tx with real-time constraints: (a) determining a real-time reference model, wherein the real-time reference model of task $T_x$ includes a plurality of micro tasks $\mu T_{xi}$, $i \in \{1, \ldots, n\}$ which are a partitioning of task $T_x$, and an order among the micro tasks $\mu T_{xi}$ according to all possible execution paths of task $T_x$, wherein for each micro task $\mu T_{xi}$, $i \in \{1, \ldots, n\}$, a micro budget $\mu B_{xi}$ which is smaller than the worst case execution time, WCET, of micro task $\mu T_{xi}$ is determined; and wherein, for each micro task $\mu T_{xi}$, $i \in \{1, \ldots, n\}$, based on the micro budgets $\mu B_{xk}$, $k \in \{1, \ldots, n\}$, a reference timing is determined that specifies an estimated timing of micro task $\mu T_{xi}$ in any possible execution of task $T_x$ such that all possible continuations of executions of task $T_x$ from micro task $\mu T_{xi}$ onward meet the real-time constraints of task $T_x$ with a probability above a tolerance boundary, wherein the real-time constraints of task $T_x$ are met with a probability above the tolerance boundary if the execution of task $T_x$ completes before a deadline of task $T_x$ with a probability lower than 100% and above a certain minimum service guarantee; (b) executing the plurality of tasks and (b1) determining after execution of micro task $\mu T_{xi}$ an actual timing; (b2) comparing the actual timing to the reference timing; (b3) based on the comparing, if it is determined that the real-time constraints of task $T_x$ are not met with a probability above the tolerance boundary, increasing the priority of task $T_x$.

This has the technical effect and advantage that the priority of real-time tasks can be adjusted according to the actual timing of the task, wherein the priority of delayed tasks may be increased. Hence a situation can be avoided where a task that has progressed sufficiently uses the execution unit, while other tasks remain delayed since they are not scheduled to run.

According to an embodiment, the micro tasks $\mu T_{xi}$, $i \in \{1, \ldots, xLast\}$ form a lattice with $\mu T_{x1}$ as an initial micro task of $T_x$ and $\mu T_{xLast}$ as a final micro task of $T_x$, the micro budget $\mu B_{xi}$ specifies an execution time to complete execution of micro task $\mu T_{xi}$ with a probability lower than 100% and above a predetermined probability threshold, and the micro budget $\mu B_{xi}$ of a micro task $\mu T_{xi}$ is preferably determined on the basis of static analysis and/or abstract interpretation of a program of $\mu T_{xi}$ and/or statistical analysis of executions of $\mu T_{xi}$.

This has the technical effect and advantage that the micro budgets and correspondingly the budgets of tasks are less conservative than budgets estimated by conventional WCET analyses. If budgets determined according to the embodiment are used for resource allocation through a scheduler, the risk of resource over provisioning can be reduced and thus efficiency of resource allocation and resource use can be improved.

According to an embodiment, the reference timing of micro task $\mu T_{xi}$ includes a micro deadline $\mu D_{xi}$, which specifies a response time up to which an execution of micro task $\mu T_{xi}$ should be finished, wherein the response time is a duration relative to an activation time $ATT_x$ of the task $T_x$; the micro task $\mu T_{xi}$ should preferably be finished until each of the micro tasks $\mu T_{xk}$, $k \in \{1, \ldots, i\}$ on a critical path from an initial micro task $\mu T_{x1}$ to a micro task $\mu T_{xi}$ has finished execution, wherein the execution time of each micro task $\mu T_{xk}$ is estimated by its micro budget $\mu B_{xk}$; the real-time constraints of task $T_x$ are not met with a probability above the tolerance boundary if the actual timing at the end of micro task $\mu T_{xi}$ exceeds the time by which micro task $\mu T_{xi}$ should have preferably been finished; and the critical path to micro task $\mu T_{xi}$ is a path among all possible execution paths of $T_x$ from the initial micro task $\mu T_{x1}$ to micro task $\mu T_{xi}$ which has the longest predicted execution time.

According to an embodiment, the micro deadline $\mu D_{xi}$ is at least the sum of micro budgets $\mu B_{xi}$ of micro tasks $\mu T_{xk}$, $k \in \{1, \ldots, i\}$ on the critical path to micro task $\mu T_{xi}$.

According to an embodiment, the reference timing of micro task $\mu T_{xi}$ includes a planned activation budget $B_{WCETxi}$ which specifies an execution time budget that is sufficient to complete the execution of task $T_x$ starting from micro task $\mu T_{xi}$ such that its real-time constraints are met with a probability above the tolerance boundary; the execution time budget is determined based on the micro budgets $\mu B_{xk}$ of the each of the micro tasks $\mu T_{xk}$, $k \in \{i, \ldots, xLast\}$ on an active critical path within $T_x$ starting at micro task $\mu T_{xi}$; the active critical path starting at micro task $\mu T_{xi}$ is a path among all possible execution paths of $T_x$ from $\mu T_{xi}$ to a final micro task $\mu T_{xLast}$ which has the longest predicted execution time; the real-time constraints of task $T_x$ are not met with a probability above the tolerance boundary if, before execution of micro task $\mu T_{xi}$, the actual response time of micro task $\mu T_{xi-1}$ is larger than the micro deadline $\mu D_{xi-1}$.

According to an embodiment, the micro tasks in an execution of task $T_x$ are categorized into soft real-time micro tasks $\mu T_{xi}$, $i \in \{1, \ldots, xrt-1\}$ and hard real-time micro tasks $\mu T_{xi}$, $i \in \{xrt, \ldots, xLast\}$, wherein an execution time of a soft real-time micro task $\mu T_{xi}$ is estimated by its micro budget $\mu B_{xi}$; and wherein an execution time of a hard real-time micro task $\mu T_{xi}$ is estimated by its micro budget $\mu B_{xi}$ plus a buffer time $BT(\mu T_{xi})$, the buffer time being an additional time to guarantee that $\mu T_{xi}$ finishes with 100% certainty within the time estimated; and wherein the execution time budget is determined further based on a sum of the estimated execution times of soft real-time and hard real-time micro task $\mu T_{xi}$.

According to an embodiment, the method comprises the following additional step: adding one or more instructions to a program of task $T_x$, the instructions causing the emission of a trace event $E_{xi}$, at the end of the execution of micro task $\mu T_{xi}$, the trace event comprising a unique identifier of a portion of the execution of task $T_x$, wherein the unique identifier preferably comprises an identifier of a hardware unit which executes task $T_x$, an identifier of task $T_x$, and an identifier of the trace event $E_{xi}$.

According to an embodiment, step (b1) of the method further comprises the steps of: determining, for an execution unit that executes the plurality of tasks, a partial actual real-time state comprising, for each task $T_x$, the most recently emitted trace event $E_{xi}$ including a point in time $CT_{Exi}$ when the trace event $E_{xi}$ was emitted; and determining a difference $\Delta S_{\mu Txi} = CT_{Exi-1} - \mu D_{xi-1}$ between an actual activation time $CT_{Exi-1}$ of micro task $\mu T_{xi}$ and a planned activation time of micro task $\mu T_{xi}$, wherein the planned activation time of micro task $\mu T_{xi}$ is the micro deadline $\mu D_{xi-1}$ of the preceding micro task $\mu T_{xi-1}$.

According to an embodiment, step (b2) further comprises determining an actual activation budget of micro task $\mu T_{xi}$ which is the planned activation budget $B_{WCETxi}$ corrected by $\Delta S_{\mu Txi}$.

According to an embodiment, in step (b3), the priority of a task $T_x$ is increased such that the smaller the difference $D_x - CT - B_{WCETxi}$ the higher the priority of $T_x$ wherein $D_x$ specifies the deadline of task $T_x$ in wall clock time, CT specifies the current wall clock time, and $B_{WCETxi}$ is the actual activation budget in execution time of micro task $\mu T_{xi}$, when trace event $E_{xi}$ is the most recently emitted trace event of task $T_x$.

According to an embodiment, the sequence of steps (b1), (b2), and (b3) is repeated in predetermined intervals until the execution of the plurality of real-time tasks is terminated, and the predetermined intervals are preferably regular.

According to an embodiment, determining the real-time reference model of task $T_x$ comprises determining possible executions of $T_x$ using methods of Worst Case Execution Time, WCET, analysis of a program of $T_x$, wherein methods of WCET analysis preferably comprise: determining a control-flow graph of the program of task $T_x$, determining feasible value ranges for variables of task $T_x$, determining a maximum number of loop iterations, modelling cache and memory access, and determining critical paths in the control flow graph, and wherein the control flow graph includes all possible execution paths of task $T_x$.

According to an embodiment, each task of the plurality of tasks is allocated to a fix execution unit during a planning period and the fix execution unit is preferably a core of a plurality of cores of a multi-core processor, and execution time is reserved on the fix execution unit according to estimated execution times of all micro tasks $\mu T_{xi}$ of all real-time tasks $T_x$ allocated to the fix execution unit, wherein reserving is preferably done by a scheduler which is an OS scheduler.

According to an embodiment, the budget $B_{WCETx}$ of task $T_x$ is the planned activation budget $B_{WCETxi}$ of the initial micro task $\mu T_{x1}$ of task $T_x$, wherein a plurality of tasks may be allocated on a same execution unit as long as the following constraints are met: the sum of estimated execution times for the hard real-time micro tasks of each task of the plurality of tasks does not exceed a certain first portion of a maximum utilization of the execution unit during the planning period; and the sum of the budgets of real-time tasks allocated to the same execution unit does not exceed a certain second portion of the maximum utilization of the execution unit during the planning period.

According to an embodiment, if a difference between an actual activation time of micro task $\mu T_{xi}$ and a planned activation time of micro task $\mu T_{xi}$ is negative, a portion of the execution time within the planning period reserved on the execution unit for execution of task $T_x$ with real-time constraints is released and thus available for execution of other tasks, wherein the planned activation time of micro task $\mu T_{xi}$ is the micro deadline $\mu D_{xi-1}$ of the preceding micro task $\mu T_{xi-1}$, and wherein the amount of released time is lower or equal to a difference between the actual time remaining until the deadline of $T_x$ and the planned activation budget $B_{WCETxi}$.

The present invention is further concerned with a method for executing a plurality of tasks, wherein one or more tasks have real-time constraints, based on a reference model of each task with real-time constraints, wherein the reference model is determined according to step (a) according to one of the embodiments specified previously, wherein the method comprises the steps (b1), (b2), and (b3) according to one of the embodiments specified previously.

The present invention is further concerned with a method for determining a real-time reference model of a task $T_x$, wherein said task has real-time constraints, the method comprising step (a) according to one of the embodiments specified previously.

The present invention is further concerned with an apparatus for executing a program including a plurality of tasks, wherein one or more tasks of the plurality of tasks have real-time constraints, the apparatus comprising the following hardware units: one or more execution units adapted to execute the plurality of tasks; a calibration unit adapted to determine a real-time reference model, wherein the real-time reference model of task $T_x$ includes a plurality of micro tasks $\mu T_{xi}$, $i \in \{1, \ldots, n\}$ which are a partitioning of task $T_x$, and an order among the micro tasks $\mu T_{xi}$ according to all possible execution paths of task $T_x$, wherein, for each micro task $\mu T_{xi}$, $i \in \{1, \ldots, n\}$, a micro budget $\mu B_{xi}$ which is smaller than the worst case execution time, WCET, of micro task $\mu T_{xi}$ determined; and wherein, for each micro task $\mu T_{xi}$, $i \in \{1, \ldots, n\}$, based on the micro budgets $\mu B_{xk}$, $k \in \{1, \ldots, n\}$, a reference timing is determined that specifies an estimated timing of micro task $\mu T_{xi}$ in any possible execution of task $T_{xi}$ such that all possible continuations of executions of task $T_x$ from micro task $\mu T_{xi}$ onward meet the real-time constraints of task $T_x$ with a probability above a tolerance boundary, wherein the real-time constraints of task $T_x$ are met with a probability above the tolerance boundary if the execution of task $T_x$ completes before a deadline of task $T_x$ with a probability lower than 100% and above a certain minimum service guarantee; an event monitoring unit adapted to determine after execution of micro task $\mu T_{xi}$ an actual timing; a budget time monitoring unit adapted to compare the actual timing to the reference timing; a hardware scheduling unit adapted to increase the priority of task $T_x$ based on a comparison result of the budget time monitoring unit, if it is determined that the real-time constraints of task $T_x$ are not met with a probability above the tolerance boundary.

According to an embodiment, the event monitoring unit is further adapted to maintain, for each real-time task $T_x$, a most recently emitted trace event $E_{xi}$ including a point in time $CT_{Exi}$ when the trace event $E_{xi}$ was emitted; the apparatus further comprises a deadline monitoring unit adapted to estimate a difference $\Delta S_{\mu Txi} = CT_{Exi-1} - \mu D_{xi-1}$ between an actual activation time $CT_{Exi-1}$ of micro task $\mu T_{xi}$ and a planned activation time of micro task $\mu T_{xi}$, and/or to detect if an execution of a micro task $\mu T_{xi}$ finishes after micro deadline $\mu D_{xi}$; the budget time monitoring unit is further adapted to determine, for each real-time task $T_x$, a deviation between a planned timing of task $T_x$ and an actual timing of task $T_x$, wherein the planned timing of task $T_x$ before execution of micro task $\mu T_{xi}$ is the planned activation budget $B_{WCETxi}$, and wherein the actual timing of task $T_x$ is estimated based on an amount of CPU time used by task $T_x$ up to the response time $CT_{Exi-1}$ and the difference $\Delta S_{\mu Txi}$; and the hardware scheduling unit is further adapted generate a real-time control value for a real-time task $T_x$ based on a deviation of the planned timing of $T_x$ from the actual timing of task $T_x$, and wherein the real-time control value is signaled to an OS scheduler.

According to an embodiment, the calibration unit is further adapted to carry out measurements of execution time of a micro task; based on the measurements, to determine information about the execution time of the micro task; and to store the information in the real-time reference model.

According to an embodiment, the information about the execution time of a micro task is a probability distribution of an execution time between a trace event marking a start of the micro task and a subsequent trace marking an end of the micro task.

The present invention is further concerned with an apparatus for executing a program including a plurality of tasks, wherein one or more tasks of the plurality of tasks have real-time constraints, the apparatus comprising: a plurality of execution units adapted to execute the plurality of tasks; a real-time scheduling unit holding a real-time reference model which includes a planned core budget $B_{COREy}$ for each execution unit $CORE_y$ of the plurality of execution units, wherein the planned core budget $B_{COREy}$ of an execution unit $CORE_y$ specifies an upper bound for the execution time that is required to complete all active RT tasks in time with the minimum service guarantee, wherein the planned core budget may be estimated as a maximum utilization of an execution unit during each planning period for micro tasks in the hard-RT or soft-RT category respectively over all planning periods considered during the calibration phase of a program including the real-time tasks, wherein a real-time task $T_x$ is active if the following two conditions are met: first, the execution of task $T_x$ has already started, i.e., the trace event $E_{x0}$ has been emitted and second the last emitted event is not $E_{xLast}$, i.e., the task $T_x$ has not yet finished; alternatively, $B_{COREy}$ may also be determined using conventional methods of schedulability analysis based on micro bugets; a budget time monitoring unit adapted to determine, for each $CORE_y$ of the plurality of execution units, an actual core budget, being a reservation of execution time for real-time tasks allocated to $CORE_y$, and possible deviations between said actual core budget and the planned core budget $B_{COREy}$, wherein the actual core budget is the execution time on $CORE_y$ that is reserved at a certain point of time within the planning period, which is preferably estimated, for example, based on the micro budgets $\mu B_{xi}$ of all micro tasks $\mu T_{xi}$ of real-time tasks $T_x$ allocated to $CORE_y$ that are active at any point in time within the planning period; and a core interference manager adapted to send core penalty signals if the actual core budget for $CORE_y$ exceeds the planned core budget $B_{COREy}$, wherein the core penalty signals are sent to one or more other execution units $CORE_z$ for which a planned core budget $B_{COREz}$ exceeds an actual core budget for $CORE_z$, the core penalty signals causing, when received by the one or more other execution units, the one or more other execution units to be de-prioritized for a predefined period of wall clock time.

According to an embodiment, de-prioritizing an execution unit includes halting the execution unit for a predefined period of wall clock time.

This has the effect and advantage that an execution unit which is temporarily halted does not contend for shared resources, e.g. on chip resources shared among execution units on the same chip, so that other execution units can access and use such shared resources with less delay.

According to an embodiment, the planned core budget $B_{COREy}$ includes a planned core budget for hard real-time micro tasks $HardB_{COREy}$ on $CORE_y$ and a planned core budget for soft real-time micro tasks $SoftB_{COREy}$ on $CORE_y$, wherein $HardB_{COREy}$ is estimated based on planned budgets of micro task $\mu T_{xi}$ in the hard real-time category for all active real-time tasks $T_x$ allocated to $CORE_y$, and wherein $SoftB_{COREy}$ is estimated based on planned budgets of micro task $\mu T_{xi}$ in soft real-time category for all active real-time tasks $T_x$ allocated to $CORE_y$.

According to an embodiment, a core penalty signal targeted to an execution unit of the one or more other execution units is sent only at a point in time which is non-critical for the execution unit.

This has the advantage and effect that execution units that execute real-time tasks that are themselves delayed are not penalized, i.e., de-prioritized.

According to an embodiment, a point in wall clock time at an execution unit to which the core penalty signal is targeted is non-critical if said execution unit is not reserved for execution of hard real-time micro tasks from said point in wall clock time for the predefined period of wall clock time.

According to an embodiment, the hardware scheduling unit is further adapted to, if a difference between the actual activation time of micro task $\mu T_{xi}$ and a planned activation time of micro task $\mu T_{xi}$ is negative, release a portion of the execution time, reserved within the planning period on the execution unit for the execution of a task $T_x$ with real-time-constraints, and thus make available the portion for execution of other tasks, wherein the planned activation time of micro task $\mu T_{xi}$ is the micro deadline $\mu D_{xi-1}$ of the preceding micro task $\mu T_{xi-1}$, and wherein the amount of released time is lower or equal to a difference between the actual time remaining until the deadline of $T_x$ and the planned activation budget $B_{WCETxi}$.

This has the technical effect and advantage that execution time which has been reserved but not used by real-time tasks may be released in a timely manner even before the real-time task terminates so that other tasks may make use of the resource. Overall, this leads to an improved resource utilization.

The present invention is further concerned with a method for executing a program including a plurality of tasks, wherein one or more tasks of the plurality of tasks have real-time constraints, wherein the plurality of tasks are executed on a plurality of execution units, the method comprising the following steps: maintaining a real-time reference model including a planned core budget $B_{COREy}$ for each execution unit $CORE_y$ of plurality of execution units, wherein the planned core budget $B_{COREy}$ of an execution unit $CORE_y$ specifies an upper bound for the execution time that is required to complete all active RT tasks in time with the minimum service guarantee, wherein the planned core budget may be determined as a maximum utilization of an execution unit during each planning period for micro tasks in the hard-RT or soft-RT category respectively over all planning periods considered during the calibration phase of a program including the real-time tasks; determine, for each $CORE_y$ of the plurality of execution units, an actual core budget, being a reservation of execution time for real-time tasks allocated to $CORE_y$, and possible deviations between said actual core budget and the planned core budget $B_{COREy}$, wherein the actual core budget is the execution time on $CORE_y$ that is reserved at a certain point of time within the planning period, which is preferably estimated, for example, based on the micro budgets $\mu B_{xi}$ of all micro tasks $\mu T_{xi}$ of real-time tasks $T_x$ allocated to $CORE_y$ that are active at any point in time within the planning period; and sending core penalty signals if the actual core budget for $CORE_y$ exceeds the planned core budget $B_{COREy}$, wherein the core penalty signals are sent to one or more other execution units $CORE_z$ for which a planned core budget $B_{COREz}$ exceeds an actual core budget for $CORE_z$, the core penalty signals causing, when received by the one or more other execution units, the one or more other execution units to be de-prioritized for a predefined period of wall clock time.

The features provided herein have at least the following advantages:

The techniques presented herein enable that the timing of an execution of a task can be controlled, even on a multicore CPU.

Furthermore, the techniques presented herein enable to implement hard real-time applications on modern CPU architectures with shared resources and multiple cores, wherein hard real-time application require certain minimum service guarantees.

Furthermore, the techniques presented herein enable to combine the execution of real-time and non-real-time tasks without compromising on real-time properties due to negative effects of sharing resources in modern hardware and processor platforms. It may further be possible to use non-real-time operating systems, such as Windows or Linux, for executing real-time applications.

Furthermore, the techniques presented herein enable new possibilities for implementing safety, security and isolation policies in real-time systems.

BRIEF DESCRIPTION OF THE DRAWINGS

FIG. 10 shows a flowchart that details the step of determining calibration information and obtaining a real-time reference model for each task $T_x$ based on the execution model of said task.

FIG. 14 shows a table that specifies the parameters of a model of a real-time task $T_x$.

FIG. 15(a) and FIG. 15(b) shows a table with timing information for an execution of $T_x$ with micro tasks according to the parameters of FIG. 14 starting with soft-RT and ending with hard-RT tasks with a calculated probability after each micro task of missing the RT deadline $D_x$ of $T_x$.

FIG. 17 further shows a situation after an execution, specifically which fraction of the reserved budget has actually been spent, i.e., was needed, in said execution specified, the execution being specified in FIG. 15. The remainder, i.e., the difference between the initial reservation and what was needed for execution is shown as rest budget, which can be available for execution of other tasks which can be RT or non-RT tasks.

DETAILED DESCRIPTION OF THE PREFERRED EMBODIMENTS

The techniques disclosed here within concern the timely execution of real-time programs, preferably on modern processor architectures.

Figure 1:
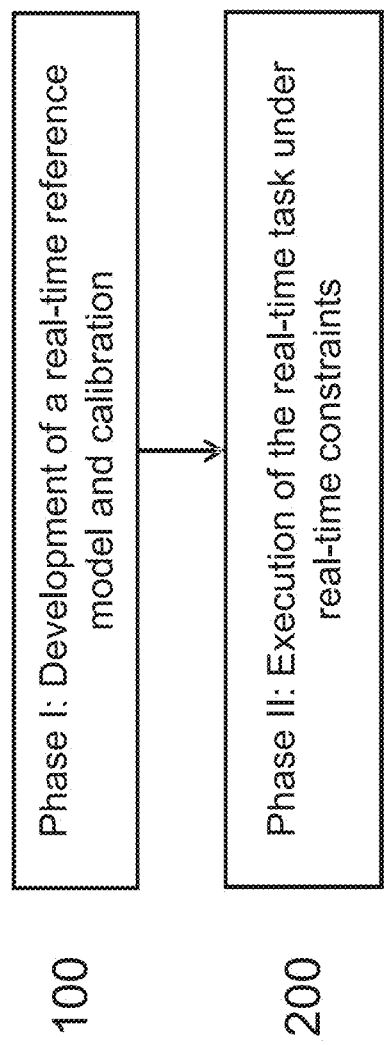
FIG. 1 shows a flow diagram with the principal steps involved when executing a program including a plurality of tasks under real-time constraints according to the present disclosure.

The method according to the present disclosure has two principal phases shown in FIG. 1. The first phase 100, also referred to as calibration phase, concerns the development of a real-time reference model and the calibration of this model of a task $T_x$ in view of the execution unit on which the execution of the task under real-time condition should take place and the allocation of other concurrent tasks. The second phase 200 concerns the actual execution of the real-time task under real-time constraints. In the second phase, information of the real-time reference model is compared to an actual timing observed during the execution of a real-time task and correspondingly, priority of the task is increased or resource reservation in terms of compute time for real-time tasks as reserved by the scheduler may be released to enable execution of other tasks. The second phase may be repeated as long as the system and the calibration information that led to the real-time reference model remain unchanged.

A real-time program may execute on a system with a multicore processor. An example of such system is illustrated in FIG. 2.

Figure 2:
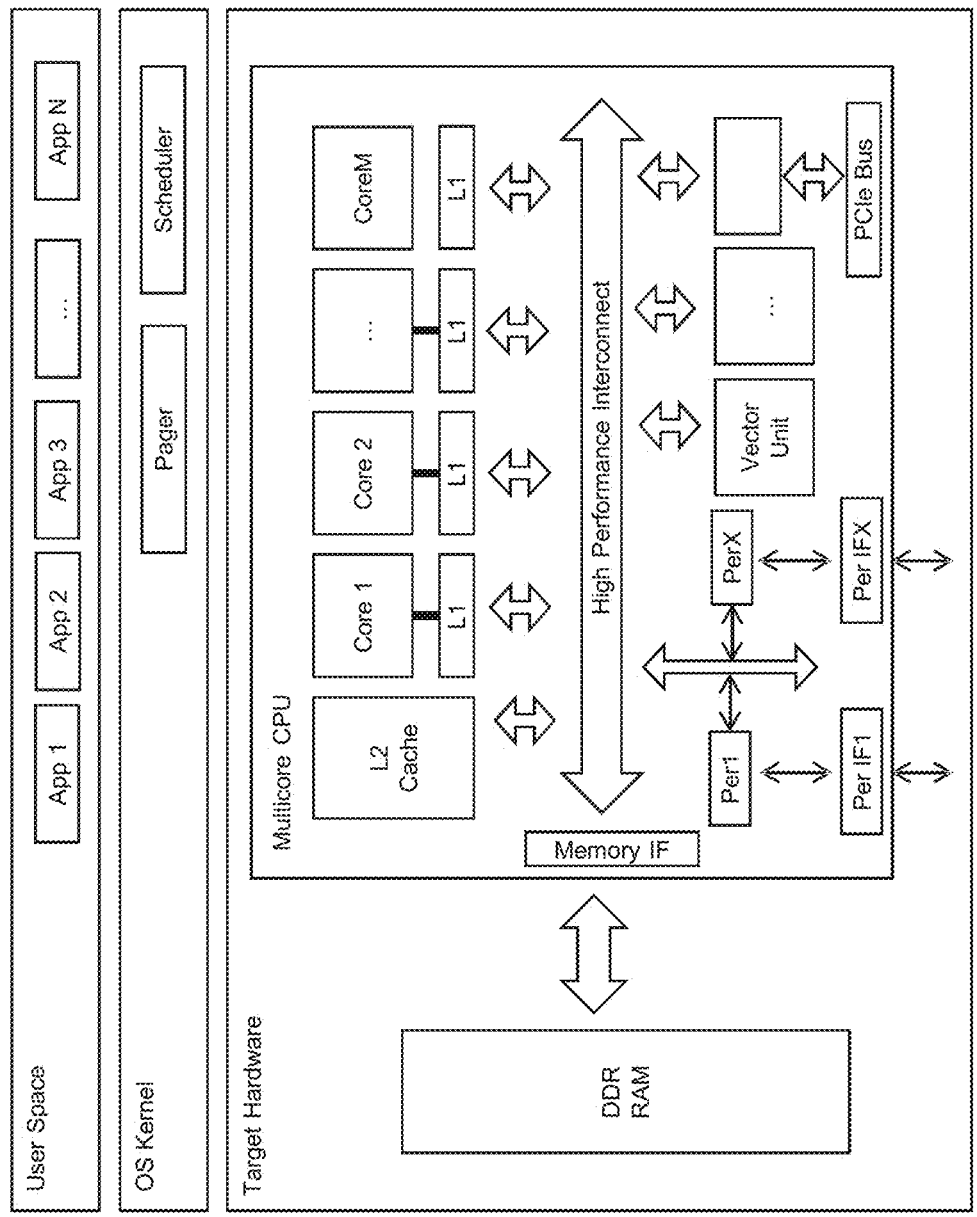
FIG. 2 shows an architectural diagram of an example computer system with a multicore processor.

FIG. 2 shows a layered architecture having layers for user space, operating system, OS, kernel, and target hardware. The user space includes one or more applications, including applications with real-time constraints. Each application includes a respective program. When an application is executed, it means that the program of the application is executed. Such execution takes place on the target hardware. Since the resources of the target hardware may be shared among the applications, the OS manages hardware resources and more specifically reserves execution units for executing certain applications according to the principles of time sharing. The reservation of an execution unit for an applications is done by a scheduler included in the OS kernel. For example, the scheduler determines for each application when and on which core of a multicore CPU an application may execute. A CPU core is an example of an execution unit. Another example of an execution unit may be a hardware thread within a CPU core in the case where the CPU core supports hyper-threading. For the purpose of illustration in this disclosure, an execution unit may execute one program, or more precisely one task specified by a program, at a time. Furthermore, it is assumed that the scheduler reserves execution time for a real time task always on the same execution unit, i.e., a given real-time task always executes on the same execution unit. In other words, a task is allocated to or "pinned" on this one execution unit. The terms execution resource and execution unit are used interchangeably. Hence each task of the plurality of tasks is allocated to a fix execution unit during a planning period and the fix execution unit is preferably a core of a plurality of cores of a multi-core processor, and wherein execution time is reserved on the fix execution unit according to estimated execution times of all micro tasks $\mu T_{xi}$ of all real-time tasks $T_x$ allocated to the fix execution unit, wherein reserving is preferably done by a scheduler which may be an OS scheduler.

FIG. 2 further shows elements of a modern OS kernel and target hardware. For example a pager included in the OS is responsible for managing the sharing of memory available in the hardware among the applications. Furthermore, the target hardware includes in the illustrated example a multi-core CPU, including several cores and a hierarchy of caches, including a shared L2 cache and L1 caches, the latter being associated with each core. Furthermore, the example hardware illustrated in FIG. 2 includes a high performance interconnect which connects the caches to a memory interface, special purpose computation units, such as a vector unit, and further interfaces, such as a logic which allows communication through a PCIe bus or similar. Furthermore the target hardware includes main memory. FIG. 2 shows just one possible system architecture. The techniques disclosed herein are also applicable to other systems, e.g. with different configurations of caches cores, etc. Specifically, the techniques disclosed herein are also applicable to architectures, which include a single execution unit.

Figure 3:
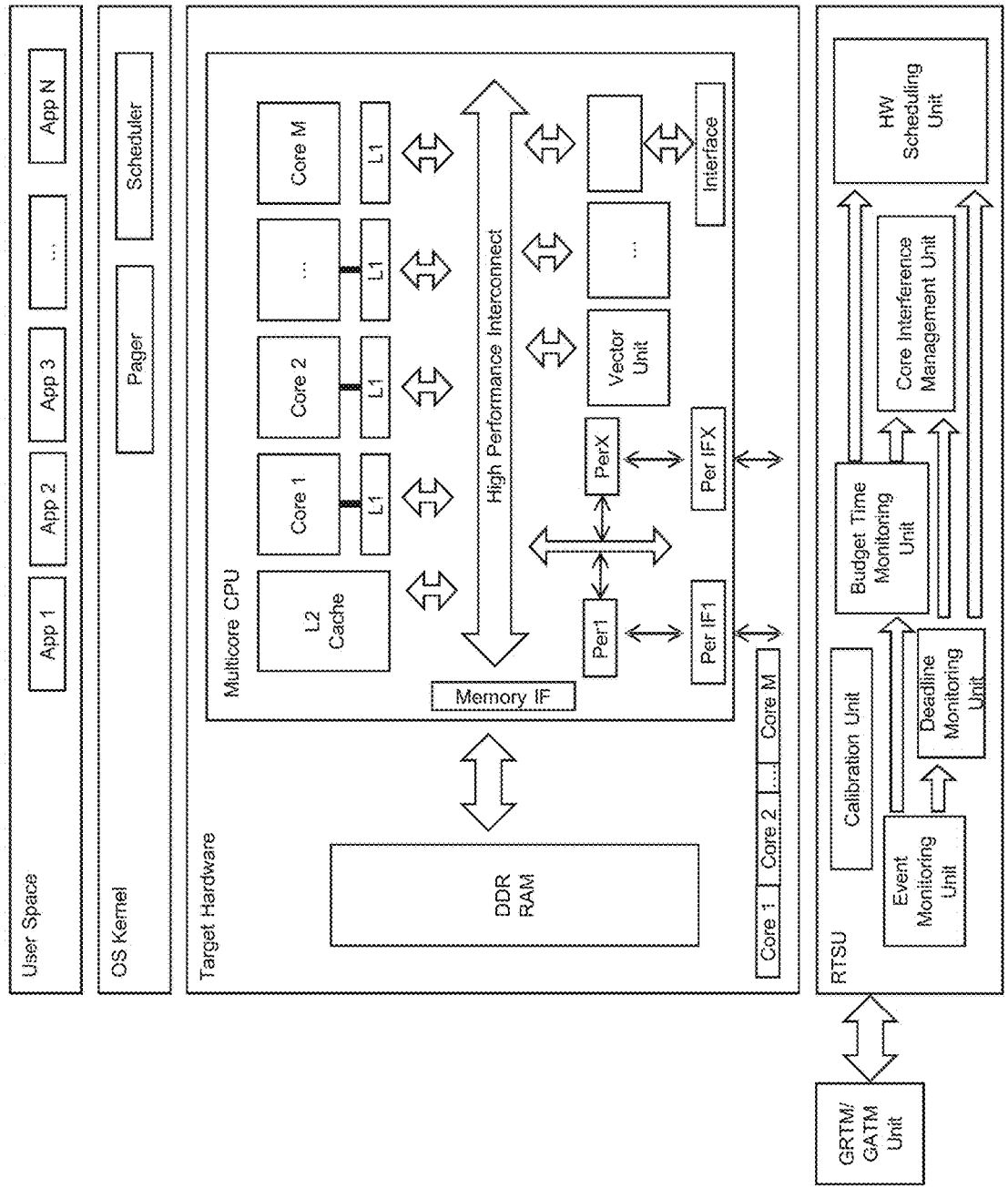
FIG. 3 shows architectural diagram of an example computer system with a multicore processor including extensions to support executing a program including a plurality of tasks under real-time constraints according to the present disclosure.

FIG. 3 illustrates the system architecture of FIG. 2 with extensions according to the present disclosure. These extensions may be implemented in hardware or software or combinations thereof. In the illustrated example, the target hardware includes a further storage element, for example a hardware register, shown as "Core 1, Core 2, . . . Core M", which serves to hold information about the progress of real-time tasks executing on each of the respective cores. The information held in this register is also referred to as partial actual timing state (PATS) comprising, for each task $T_x$, a most recently emitted trace event $E_{xi}$ including a point in time $CT_{Exi}$, which is a wall clock time, when the trace event is emitted. This information may be communicated from said hardware register to a real-time scheduling unit, RTSU, or the "GRTM/GATM" unit discussed in the following.

FIG. 3 shows an architectural extension "GRTM/GATM", which is an efficient storage. This storage holds, for each real-time task, information about the planned execution times of the task. This information is determined ahead of time of an execution of the task under real-time constraints, i.e., in step 100 of FIG. 1, and is referred to as global reference timing model (GRTM). The efficient storage further holds information about the actual progress of an execution of a real-time task, i.e., in step 200 of FIG. 1, when executing under real-time constraints. This information is referred to as the global actual timing model (GATM), which is repeatedly updated during the execution of the real-time task. During the execution of the real-time task, the actual timing specified by the GATM and the reference timing expressed by the GRTM are compared and accordingly the priority of a real-time task $T_x$ may be increased by a scheduler if it is determined that the real-time constraints of task $T_x$ are not met with a probability above a tolerance boundary. The efficient storage for holding the real-time reference model and the actual timing model may be implemented as a separate hardware unit connected through an interface to the real-time scheduling unit and/or the processor, or it may be integrated closely with the processor as a special unit for supporting real-time execution inside the processor.

FIG. 3 shows a real-time scheduling unit, RTSU, which includes different units that are designed to support and/or perform the method according to this disclosure efficiently and in particular the second phase 200 of FIG. 1. The method for executing a real-time program described herein includes various additional steps that are not directly concerned with the computation described by the real-time program itself but with tracking the timing behavior of the real-time program, determining if there is an undue delay in the execution, and accordingly providing information to a scheduler.

These additional steps are executed alongside the steps for carrying out the computation according to the program of the real-time task; these additional steps should preferably not negatively affect, i.e., delay the computation according to the program of the real-time task. For that reason, efficient support for carrying out these additional steps, for example by additional hardware units of the RTSU, is provided in order not to negatively affect or delay the operation of units known from the system without extensions as illustrated in FIG. 2. The real-time scheduling unit may be implemented as a separate hardware unit connected through an interface to the processor core, or it may be integrated closely with the processor as a special unit for supporting real-time execution inside the processor.

The calibration unit supports the creation of the real-time reference model according to the first phase 100 of FIG. 1 by collecting statistical information about the execution time taken to execute a portion of a real-time task called micro task. The determining of execution durations of portions of a real-time program may involve executing and profiling the program, however not under real-time constraints but for the purpose of determining statistical information about the timing of possible executions of the respective program portions. To obtain measurements which reflect execution times close to those under real-time conditions, the execution times may be determined under conditions of resource sharing with other tasks as they would occur when the task executed under real-time constraints.

The event monitoring unit supports determining the occurrence of so called trace events, or simply called events, during the execution of a real-time task. A trace event, event for short, is emitted by a certain instruction in the program of a task.

To emit events during the execution of a task $T_x$, one or more instructions are added to the program of task $T_x$, the instructions causing the emission of a trace event $E_{xi}$, at the end of the execution of a micro task $\mu T_{xi}$, the trace event comprising a unique identifier of a portion of the execution of task $T_x$. Thereby, the unique identifier preferably comprises an identifier of a hardware unit which executes task $T_x$, an identifier of task $T_x$, and an identifier of the trace event $E_{xi}$.

When an event occurs, i.e., when an event is emitted during the execution of a task $T_x$, information about the event, which includes the wall-clock time at which the event is emitted, may first be written to an efficient storage within a processor, which could e.g. be a register. The information may then be obtained from such register by the event monitoring unit, e.g. to perform updating of the global actual timing model (GATM). Furthermore, the event monitoring unit may maintain for each task $T_x$ one or more of an actual execution path and response times of micro tasks $\mu T_{xi}$, which completed on the actual execution path based on a partial actual real-time state comprising, for each task $T_x$, a most recently emitted trace event $E_{xi}$ including a point in time $CT_{Exi}$ when the trace event was emitted.

The deadline monitoring unit detects if an execution of a micro task $\mu T_{xi}$ finishes after micro deadline $\mu D_{xi}$. Furthermore, the deadline monitoring unit may determine for each task, based on the most recent trace event of the task, which specifies the progress the task has made up to a certain point in wall-clock time, a reference time obtained from the global reference timing model (GRTM) of the task, and the actual remaining wall clock time until the deadline, whether the priority of the task is to be increased, which is effected by the hardware scheduling unit. In other words, the deadline monitoring unit is designed to estimate a difference $\Delta S_{\mu Txi} = CT_{Exi-1} - \mu D_{xi-1}$ between an actual activation time $CT_{Exi-1}$ of micro task $\mu T_{xi}$ and a planned activation time of micro task $\mu T_{xi}$, and/or to detect if an execution of a micro task $\mu T_{xi}$ finishes after micro deadline $\mu D_{xi}$.

A core interference manager may increase the priority of the execution unit or priority of hardware resources shared by the execution unit on which the task is allocated. Thereby the reference time may be a planned remaining execution time of a task, which is expressed as the activation budget of the task. For determining whether the priority of a task is to be increased, a difference between said reference time and the remaining wall-clock duration to the deadline of the task may be determined. For example, if it is determined that the wall-clock duration until the deadline of the task is only slightly higher or equal to the activation budget, which is a predicted execution time until the end of the task according to the real-time reference model, then the priority of this task vs. other concurrent tasks on the same execution unit is likely increased. The reasons for such a scenario can be as follows: the actual execution time required by the task is high and for soft-RT tasks possibly higher than estimated in the real-time reference model and/or the execution of the task is delayed in wall-clock time due to intermittent execution of other concurrent tasks on the same execution unit.

The budget time monitoring unit manages budget times for real-time tasks on all execution units, wherein the budget, as will be explained later, falls into the categories of budget reserved for hard-RT micro tasks and soft-RT micro tasks. The budget time monitoring unit determines for each execution unit and each task allocated to this execution unit, a difference between the execution time used by task $T_x$ up to the most recent trace event $E_{xi}$ of $T_x$ and the planned execution time reserved on the execution unit for $T_x$ up to the end of micro task $\mu T_{xi}$, which is included in the real-time reference model and which is also called the micro deadline $\mu D_{xi}$ of micro task $\mu T_{xi}$. In other words, the budget time monitoring unit is designed to determine for each task $T_x$, a deviation between a planned timing of task $T_x$ and an actual timing of task $T_x$, wherein the planned timing of task $T_x$ before execution of micro task $\mu T_{xi}$ being the planned activation budget $B_{WCETxi}$, and wherein the actual timing of task $T_x$ is estimated based on an amount of CPU time used by the task $T_x$ up to the response time $CT_{Exi'1}$ and the difference $\Delta S_{\mu Txi}$. If more time has been reserved than used by the actual execution of $T_x$ up to that point, i.e., the real-time task $T_x$ took less execution time than planned, so that excess budget reserved on the execution unit may be released and made available to other tasks (e.g. non-RT) on the same execution unit. On the other hand, if the execution time used by a task up to $E_{xi}$ is larger than what has been reserved as budget on that execution unit, measures are taken to ensure that the operation the execution unit may be prioritized over other execution units, e.g., that one core is prioritized over another core in a multicore CPU system. Such prioritization is effected by the core interference manager unit. It should be noted that the situation that more execution time is taken by a task than actually planned and reserved may only arise while the task is executing micro tasks in the soft-RT category as will be explained later in more detail. For tasks in the hard-RT category, the planned budget is always sufficiently high, since it is calculated based on the WCET of micro tasks.

For further illustration, the following scenario is described: The deadline monitoring unit may determine for a task $T_x$ that, based on the wall-clock timing of the task which is given as the actual progress based on the most recently emitted trace event, the estimated remaining execution time of the task, and the wall clock duration remaining to the deadline of the task that the task is to be prioritized over other concurrent tasks. On the other hand, for the same task, the budget time monitoring unit may determine that the task required less execution time than estimated and thus release reserved budget on the CPU.

The hardware scheduling unit, HW scheduling unit, notifies an operating system scheduler to adjust the priority of a real-time task. The HW scheduling unit bases its decision to issue said notification based on information obtained from the deadline monitoring unit and/or the budget time monitoring unit.

Furthermore, the RTSU includes a core interference manager, which provides hints for prioritizing certain execution units on the multicore CPU for use of shared processor resources such as such as shared caches or interconnect bandwidth. The hints are provided on the basis of information from the deadline monitoring unit or the budget time monitoring unit. Since each task is pinned, i.e., fixed, to a certain execution unit, the core interference manager hints at prioritizing resource use for execution units, which are for example processor cores, that execute tasks for which higher priority is requested by the HW scheduling unit.

Figure 4:
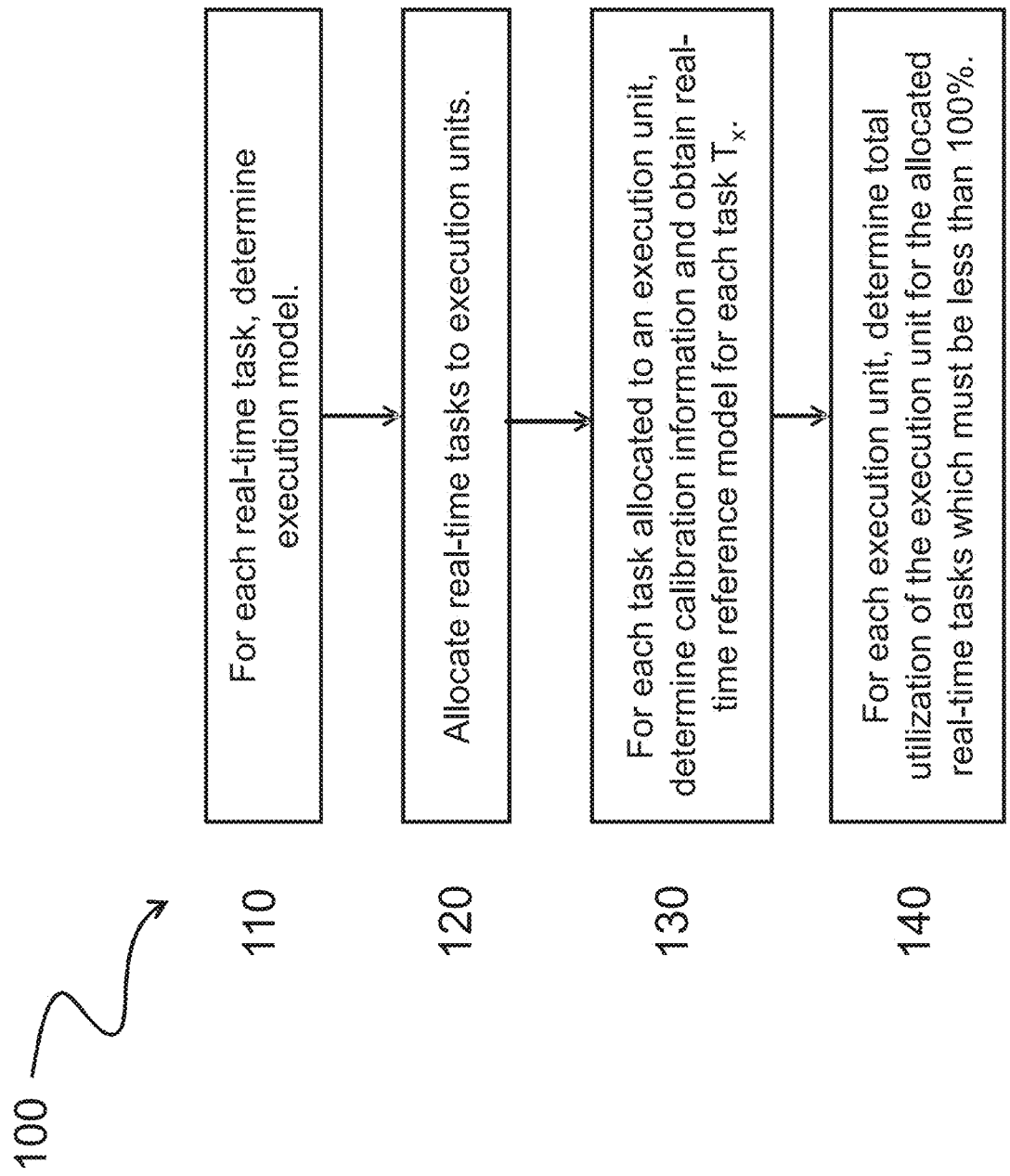
FIG. 4 shows a flowchart that details the step of developing a real-time reference model and calibration.

The method for executing a program including a plurality of tasks with real-time constraints, which steps are supported in part by the RTSU and its units as described above, is described in more detail based on FIG. 4 to FIG. 18 in the following. FIG. 4 shows a flowchart that details the step 100 of developing a real-time reference model and calibration. In a first step 110, an execution model is determined for each real-time task. An execution model specifies a plurality micro tasks $\mu T_{xi}$, $i \in \{1, \ldots, n\}$, which are a partitioning of task $T_x$, and an order among the micro tasks $\mu T_{xi}$ according to the possible execution flows of task $T_x$. The execution model of a task $T_x$ is typically based on and built from information included in the program of $T_x$. For example, possible execution flows can be obtained from the control flow graph of the program of $T_x$. If the control flow graph of a program has cycles, all program parts, corresponding to basic blocks of the control flow graph, included in a cycle may form one common program part, i.e., a larger block, so that for the purpose of the execution model considered here, the possible flows of the program of $T_x$ can be regarded as acyclic. In addition to the control flow obtained from the program of task $T_x$, a task may have dependence and communication relations with other tasks, which can be control or data dependences, as well as dependences on external events, which are for example relating to input and output. The execution model of a task will thus include and take into account these and other aspects that possibly influence the timing behavior of a task and which are commonly known in real time program analysis related to a task execution models. In the second step 120, tasks are allocated to execution units. Thereby, an allocation specifies which tasks are allocated on which execution unit. As mentioned above, it is assumed in the following that tasks are pinned to execution units. The calibration step 130 basically associates estimated timing information with the execution model of a task. The model resulting from step 130 is called real-time reference model of task $T_x$. The estimated timing can be obtained by static or dynamic program analysis and further methods available in the area of worst case execution time estimation. For example, the information about the execution time of a micro task can be a probability distribution of an execution time between a trace event marking to a start of the micro task and a subsequent trace marking an end of the micro task. The time between subsequent trace event can be obtained through static and/or dynamic program analysis, for example through abstract interpretation and/or profiling. In step 140, after it to be determined, based on the real-time reference models of each allocated task $T_x$, if the task allocation on the execution unit is feasible. An allocation is feasible, if the total utilization of the execution unit when considering that all allocated tasks are executed, is less than 100% while guaranteeing with a certain minimum service guarantee, which is for example $(100-10^{-9})\%$, that all tasks meet their real-time constraint, i.e., that all tasks complete execution before their associated deadline. In the following, this minimum service guarantee is also referred to as tolerance boundary.

Figure 5:
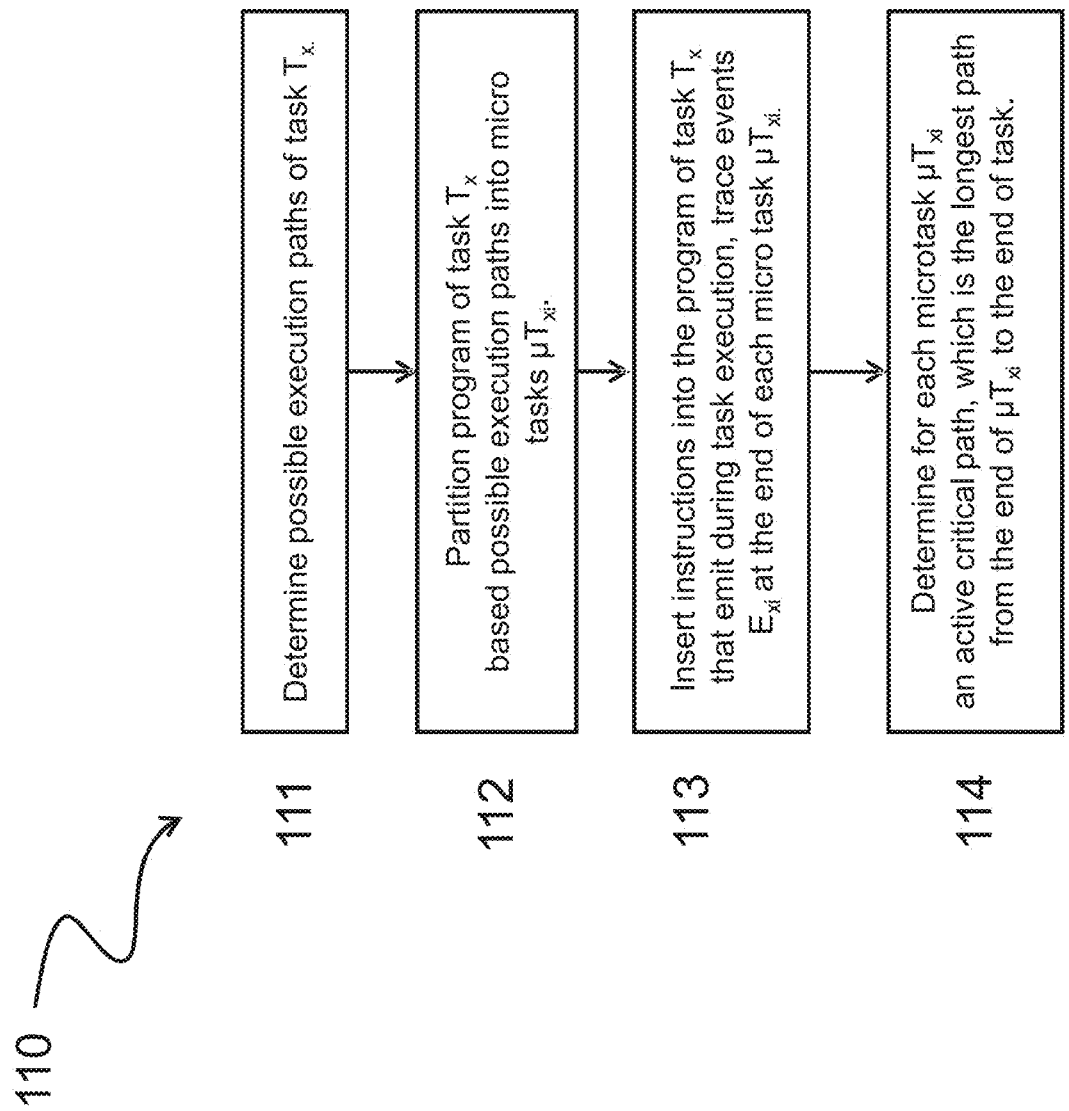
FIG. 5 shows a flowchart that details the step of determining an execution model for each real-time task.
Figure 6:
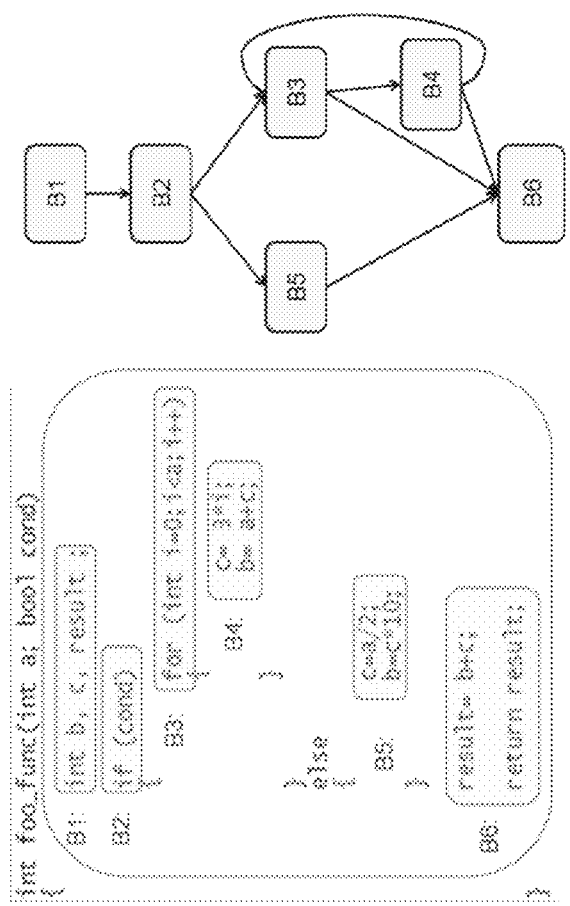
FIG. 6 shows an example program and its control-flow graph.
Figure 7:
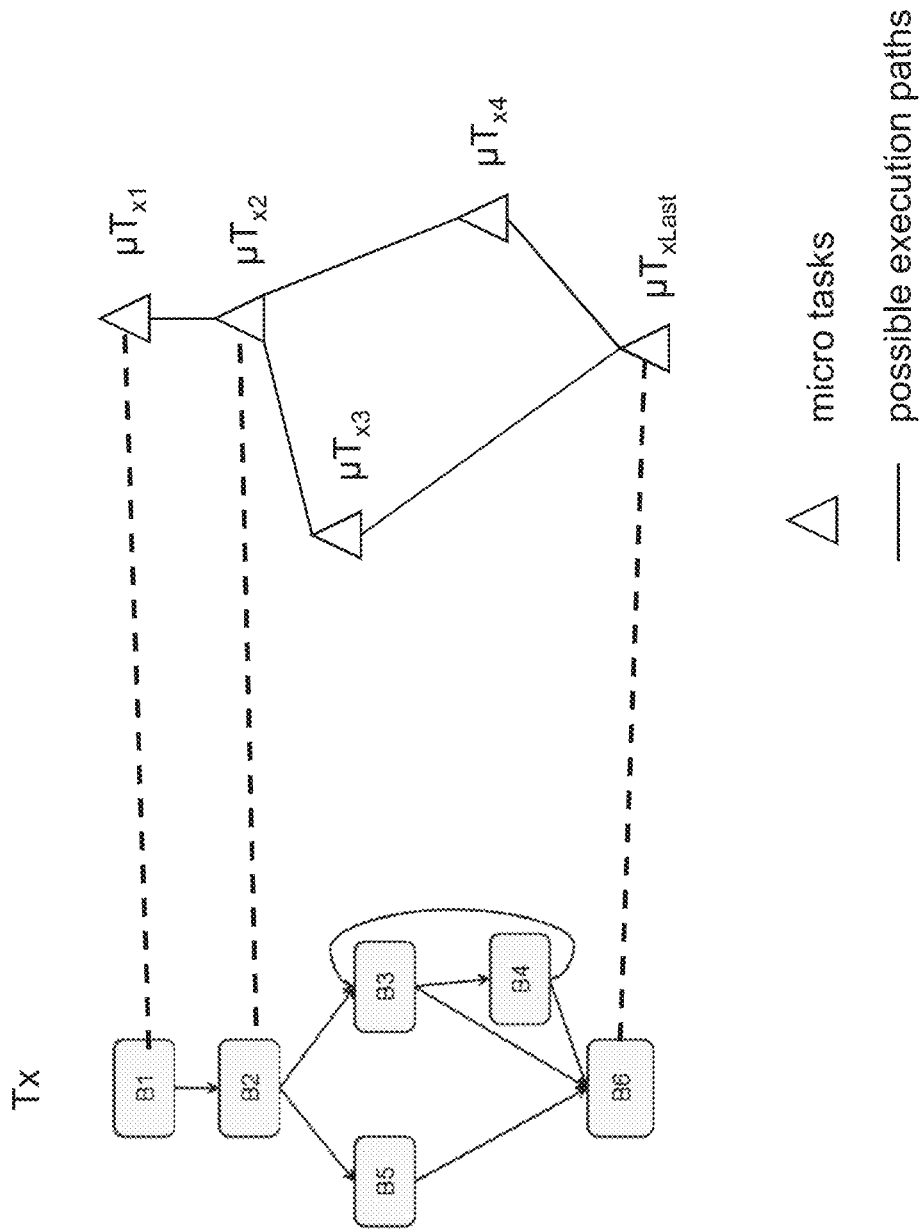
FIG. 7 shows correspondence between portions of the control flow graph of a program of a task and an execution model of the task.

FIG. 5 details the step 110 of determining an execution model for task $T_x$. In a first step 111, all possible execution paths of task $T_x$ are determined. As discussed above, a model of possible execution flows of a task into account at least the control flow graph of the program of task $T_x$, synchronization and communication relations with other tasks and also external events that influence the execution path and possibly the timing behavior of task $T_x$. The model of possible execution flows of task $T_x$ is preferably acyclic. An example of a control-flow graph is shown in FIG. 6. Static analysis methods for determining a control flow graph including basis blocks from a program source code are known in the art. The next steps 112 concerns partitioning the program of task $T_x$ based on the control flow graph into micro tasks $\mu T_{xi}$. This partitioning is such, that every possible execution of a task is a sequence of micro tasks. Portions of the program which are repeated, such as the body and condition of a loop construct, are preferably included in a single micro task. For example, if the control flow graph of a program has cycles, all program parts, corresponding to basic blocks of the control flow graph, included in a cycle may form one common program part, i.e., a larger block, so that for the purpose of the execution model considered here, the possible flows of the program of $T_x$ can be regarded as acyclic. Thus, in said sequence of micro tasks, each micro task occurs once, i.e., micro tasks are not repeated. In the example of FIG. 6, the basic blocks B3 and B4 and thus also the corresponding portions of the program shown on the left of FIG. 6, for example, are preferably combined when forming micro tasks. As a result, the execution model for a task is a partial order of micro tasks, wherein micro tasks $\mu T_{xi}$ $i \in \{1, \ldots, xLast\}$ form a lattice with $\mu T_{x1}$ as an initial micro task of $T_x$ and $\mu T_{xLast}$ as a final micro task of $T_x$. This is shown in FIG. 7, which illustrates correspondence between portions of a control flow graph of a program of a task on the left side and an execution model of the task on the right side. The micro tasks shown on the right side form a lattice. In the example there is in some cases correspondence between a single basic block and a micro task. The conception of a micro task is however not limited in that way, which means that also larger portions of a program comprising multiple basic blocks, or parts of a basis block may form a single micro task, as long as the above properties of micro tasks and the program execution model hold.

Thus, the real-time reference model of task $T_x$ includes a plurality micro tasks $\mu T_{xi}$, $i \in \{1, \ldots, n\}$, which are a partitioning of task $T_x$, and an order among the micro tasks $\mu T_{xi}$ according to all possible execution paths of task $T_x$. Thereby, for each micro task $\mu T_{xi}$, $i \in \{1, \ldots, n\}$, a micro budget $\mu B_{xi}$ is determined which is smaller than the worst case execution time, WCET, of micro task $\mu T_{xi}$. The micro budget $\mu B_{xi}$ specifies an execution time to complete execution of micro task $\mu T_{xi}$ with a probability lower than 100% and above a predetermined probability threshold. Furthermore, for each micro task $\mu T_{xi}$, $i \in \{1, \ldots, n\}$, based on the micro budgets $\mu B_{xk}$, $k \in \{1, \ldots, n\}$, a reference timing is determined that specifies an estimated timing of micro task $\mu T_{xi}$ in any possible execution of task $T_{xi}$ such that all possible continuations of executions of task $T_x$ from micro task $\mu T_{xi}$ onward meet the real-time constraints of task $T_x$ with a probability above a tolerance boundary, wherein the real-time constraints of task $T_x$ are met with a probability above the tolerance boundary if the execution of task $T_x$ completes before a deadline of task $T_x$ with a probability lower than 100% and above a certain minimum service guarantee.

Figure 8:
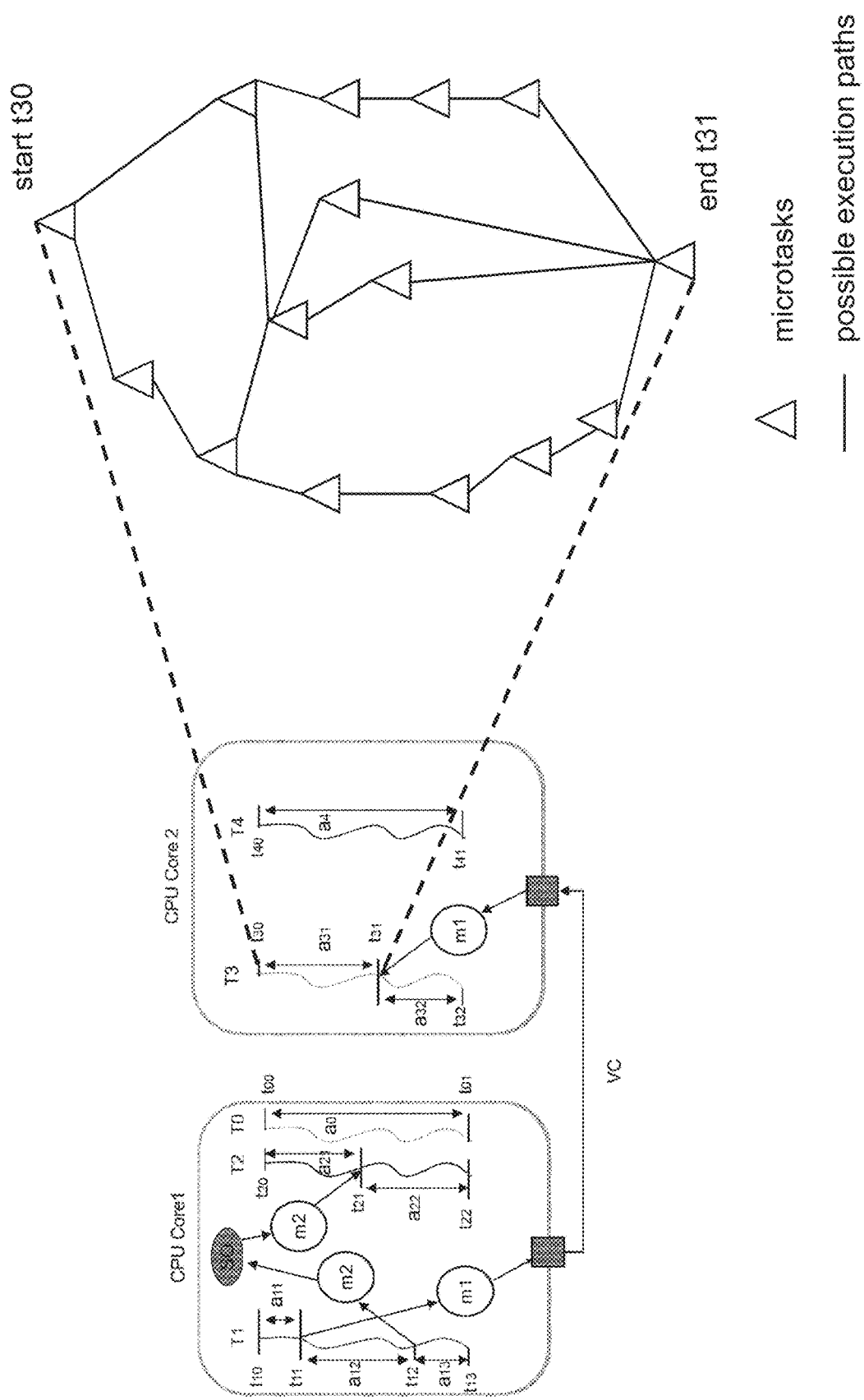
FIG. 8 shows executions of a plurality of tasks on a multicore processor, and an execution model of one task of said plurality of tasks including possible execution paths of the task forming a lattice of micro tasks of the tasks.

Back to FIG. 5, step 113 concerns inserting instructions into the program of task $T_x$. The inserted instruction serve to emit trace events when the task is executed. The purpose of trace events is to signal the progress of task execution, for example to the real-time scheduling unit discussed above. The inserted instructions are conceived such that every trace event has a CPU wide unique identifier, which signals the completion of execution of a micro task, which is a portion of the execution of task $T_x$. In addition to the unique identifier, a time stamp is included in the emitted event, which specifies the current wall clock time at which the event is emitted. This may be an absolute time or a time relative to the start time of the task. The unique identifier preferably comprises an identifier of a hardware unit which executes task $T_x$, an identifier of task $T_x$, and an identifier of the trace event $E_{xi}$, which corresponds to the micro task at which end the instruction for emitting the event is inserted. The conception of micro tasks and correspondingly the insertion instructions at the end of a micro task for the purpose of signaling an event as described above can be done manually by a software designer or architect who may place the boundaries of micro tasks and the instructions according to the application logic, or can be done automatically by means of development tools, or a combination of automated and manual placement. At the first micro task of a task, an instruction for the emission of a start event may be inserted. For further illustration of the concept of micro task and the execution model of a task $T_x$, FIG. 8 shows an example execution of task T3 on the left, wherein one portion of the execution starts at point t30 and ends at point t31 is shown as a small curved line; only for illustration, said points are the start of the task T3, and the point in the execution where task T3 reads some message m1 respectively. On the right of FIG. 8, the execution model of the program of task T3 is shown, which illustrates that different paths in the control flow of the program may lead from point t30 to t31. In the concrete execution shown on the left, only one of the multiple possible control flows shown on the right has been taken.

Back to FIG. 5, step 114 concerns determining, for each micro task $\mu T_{xi}$, of an active critical path, ACP, which is the longest path from the end of $\mu T_{xi}$ to the end of task. This step can be supported by known methods used in the context of WCET analysis, which are for example: extraction of a control flow graph, which is already available from step 111, estimation of value ranges for variable and in particular for loop bounds, cache and memory access modeling and analysis. Furthermore, possible execution paths of a task $T_x$ can be approximated and determined using a control flow graph of the program of $T_x$. FIG. 9A shows an example task execution model with an ACP starting at the micro task $\mu T_{x1}$, namely the path through the leftmost sequence of micro tasks in the illustrated task execution model. An ACP associated with a micro task $\mu T_{xi}$ always ends at the end of the last, in view of the order of the lattice, reachable micro task among possible control flows starting at $\mu T_{xi}$. For the purpose of determining the ACP as the longest path, the length of a control flow path is determined as the sum of WCETs of each micro task on the control flow path.

Figure 9B:
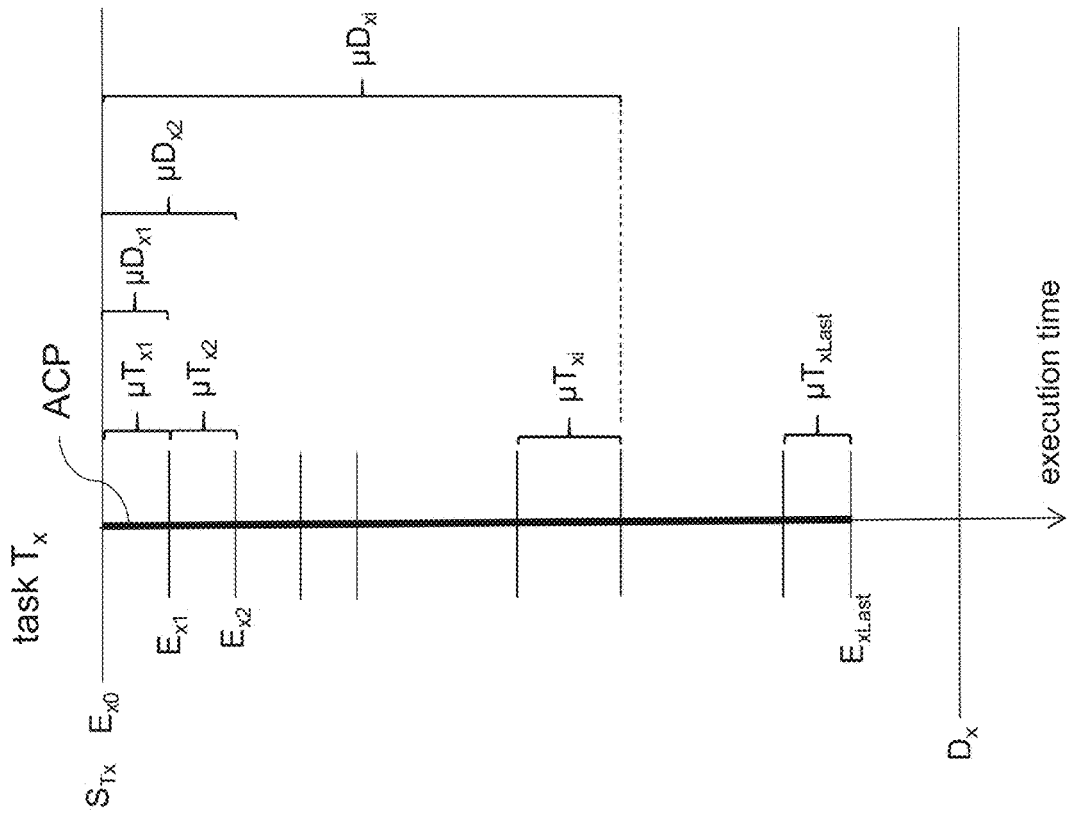
FIG. 9B shows a specific execution along the active critical path shown in FIG. 9A, being a sequence of micro tasks with respective micro deadlines along said active critical path.
Figure 9A:
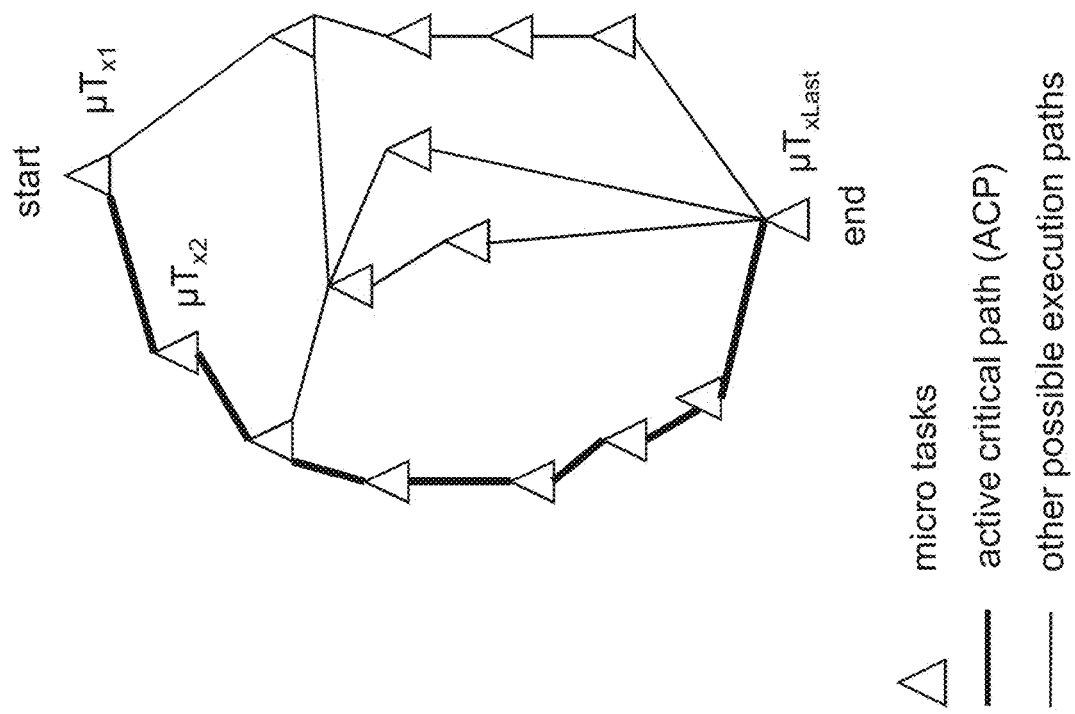
FIG. 9A shows an execution model of a task, the execution model including information about an active critical path.

The following terminology and identifiers are defined and used in FIG. 9B and in subsequent illustrations and formulas:

$T_x$—real-time task X
$ATT_x$—absolute activation time of $T_x$
$J_{Tx}$—start jitter of $T_x$
$S_{Tx}=ATT_x+J_{Tx}$—starting time of $T_x$ (the point in time where $T_x$ starts executing)
$D_x$—deadline for $T_x$
$E_{xi}$—i-th trace event within an ACP
$\mu T_{xi}$—micro task between $E_{xi}$ and $E_{xi-1}$
$\mu D_{xi}$—micro deadline, $\mu D$, which is a deadline relative to $S_{Tx}$, which specifies until when event $E_{xi}$ must occur.

FIG. 9B illustrates the timing of an execution of task $T_x$ along the ACP of $\mu T_{x1}$, which is the start of the task $T_x$. During the execution, the start and end of each micro task and their timing can be obtained from the sequence of events $E_{xi}$. The end of the task is marked by event $E_{xLast}$ which occurs at a point in time well before the deadline so that task $T_x$ meets its real-time constraints. The vertical sections $\mu T_{xi}$ along the time axis show the interval during which task $\mu T_{xi}$ is executed. The sequence of trace events and their associated timing information allows to precisely reconstruct which of the control flow paths has been executed and also the timing, i.e., the duration, of each of the micro tasks executed along the path.

Back to FIG. 4, step 120 concerns allocating real-time tasks to execution units. FIG. 8 shows on the left, for example, that tasks T0, T1, and T2 are allocated to CPU Core 1, and tasks T3, and T4 are allocated to CPU Core 2. Some of the tasks shown in FIG. 8 have dependences among each other due to a synchronization or communication relation. For example, task T1 communicate a message m2 to Task T2 via a shared object SO, the message m2 being sent at point $t_{12}$ of task T1 and being received at point $t_{21}$ of task T2. In this case, the communication occurs between tasks allocated to the same execution unit. This communication relation leads to a dependence that is reflected in the model of possible program flows and execution paths. Likewise task T1 has a communication relation with task T3 communicating a message m1 through a virtual channel VC, wherein the communicating tasks are allocated to different execution units. This communication relation leads to a dependence that is reflected in the model of possible program flows and execution paths. To simplify the illustration and the discussion related to the model of possible execution paths herein, the examples described and discussed, specifically the models shown in FIG. 6, FIG. 7, the right part of FIG. 8, and FIG. 9 relate to the control flow of a program and do not show a scenario of a model of possible execution paths that involves dependences among different tasks (except for the left side of FIG. 5). It will however be understood that the techniques that the determining a model of possible execution paths and timing of a task $T_x$ does not only take into account dependences arising from the control flow of the program constituting the task $T_x$ itself but also dependences and timing related information due to communication and synchronization with other tasks.

As will be described in the following, task allocation occurs before the calibration step 130. This is because information about which tasks are allocated on the same execution unit, which is also referred to as task colocation, may affect the timing behavior of each micro task, and thus also each task due to the sharing of resources on an execution unit and also among different execution units within the same execution unit. For example multiple tasks that execute on the same execution unit, which could for example be a processor core, may share the L1 cache. Tasks allocated on different execution units may share the L2 cache. Timing behavior refers to a statistical model that considers a statistical distribution of execution times observed for repeated test executions of each micro task in a specific allocation of tasks to execution units determined at step 120.

Referring to FIG. 4, at step 130, the execution model of each task is parameterized with timing information obtained through a calibration step which is supported by the calibration unit as follows:

Calibration requires execution models of all tasks that are allocated in step 120. The execution models of these tasks are determined in step 110. Furthermore, the calibration is controlled by a statistical threshold value, for example 75%, which is predetermined, for example, by a software developer, and which serves to determine an estimated execution time for each micro task based on a probability distribution of the execution duration of the micro task. Accordingly, for a threshold value of $P_{thr}$, the estimated execution duration of micro task $\mu T_{xi}$ is the duration to complete execution with a probability lower than 100% and above the threshold value $P_{thr}$. This estimated execution duration is also referred to as micro budget $\mu B_{xi}$ of a task $\mu T_{xi}$.

Figure 11A:
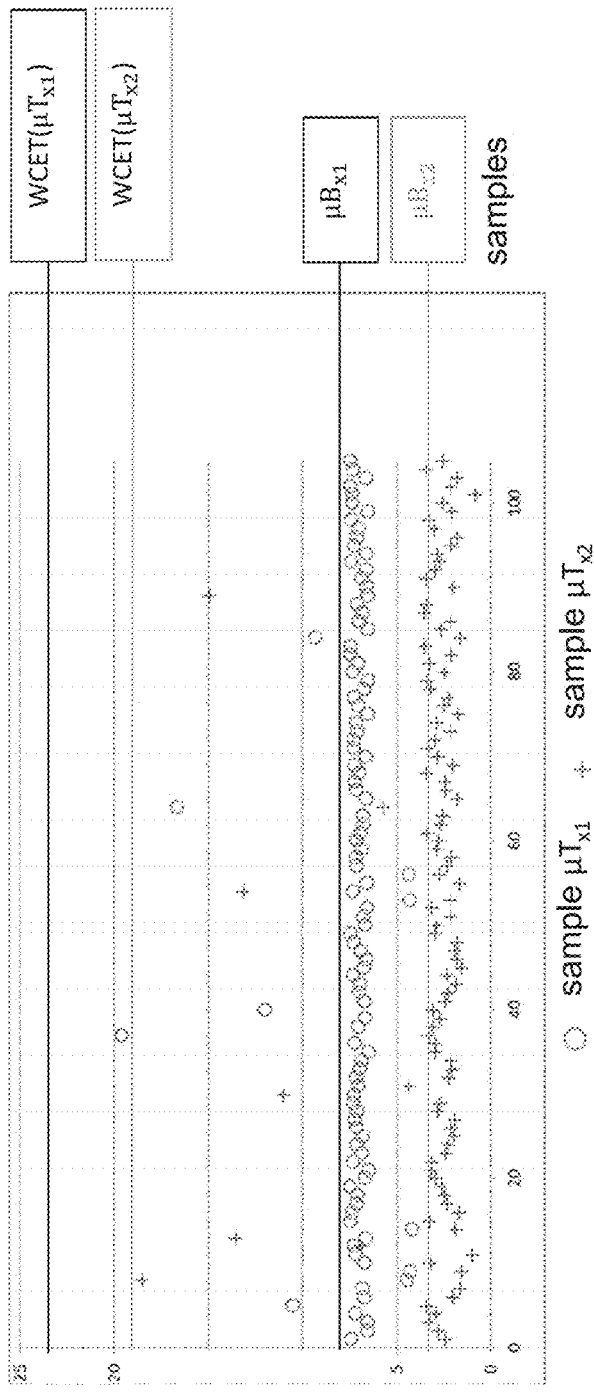
FIG. 11A shows a visualization of sampled execution times of micro tasks $\mu T_{x1}$ and $\mu T_{x2}$, their micro budgets $\mu B_{x1}$ and $\mu B_{x2}$, and WCET determined for each of the micro tasks.

Step 130 is further detailed in FIG. 10. In a first step 131 a micro budget $\mu B_{xi}$ is determined for each micro task of task $T_x$, wherein said micro budget is smaller than the worst case execution time, WCET, of micro task $\mu T_{xi}$. The micro budget $\mu B_{xi}$ of a task $\mu T_{xi}$ is preferably determined on the basis of a static analysis of the program code of $\mu T_{xi}$ and/or a statistical analysis of executions of $\mu T_{xi}$. Such an analysis is supported by the calibration unit as follows: repeatedly measure the execution times of tasks and micro tasks to obtain information about their execution duration, which is, for example if a task makes exclusive use of the execution unit, the duration in wall clock time between two consecutive trace events. In other cases, the execution time used by a task may be obtained from the operating system; determine a statistical distribution for the execution duration of each micro task. For example, referring to FIG. 9B, the execution duration of micro task $\mu T_{x2}$ can be obtained by determining, in this illustration, the time between trace event $E_{x1}$ and $E_{x2}$. Based on the statistical distribution of execution times of micro task $\mu T_{xi}$, the micro budget $\mu B_{xi}$ of micro task $\mu T_{xi}$ may be determined as a duration at which a sampled execution of $\mu T_{xi}$ has completed with a probability of $P_{thr}$, which is a predetermined probability threshold, for example 0.75, i.e., 75%. Hence the micro budget $\mu B_{xi}$ of a micro task $\mu T_{xi}$ is preferably determined on the basis of a static analysis and/or abstract interpretation of the program of $\mu T_{xi}$ and/or a statistical analysis of executions of $\mu T_{xi}$. This duration is shorter than the WCET of $\mu T_{xi}$. FIG. 11A illustrates this aspect as follows. The figure shows samples (horizontal axis) of executions times (vertical axis) for two different micro tasks $\mu T_{x1}$, for which each sample is shown as a small circle, and $\mu T_{x2}$, for which each sample is shown as a small '+' sign. For each micro task corresponding horizontal lines show the WCET and the micro budget. The WCET specifies the duration within which any execution of the respective micro task under any possible adverse circumstances of resource sharing terminates. The micro budget specifies a lower value wherein samples terminate with a probability of $P_{thr}$, $P_{thr}$ being a probability lower that 1.0.

Further, in a second step 132, for each micro task $\mu T_{xi}$, $i \in \{1, \ldots, n\}$, based on the micro budgets $\mu B_{xk}$, $k \in \{1, \ldots, n\}$, a reference timing is determined that specifies an estimated timing of micro task $\mu T_{xi}$ in any possible execution of task $T_x$ up to the end of micro task $\mu T_{xi}$, such that all possible continuations of executions of task $T_x$ according to the execution model of the task $T_x$ meet the real-time constraints of task $T_x$ with a probability above the tolerance boundary.

Figure 11B:
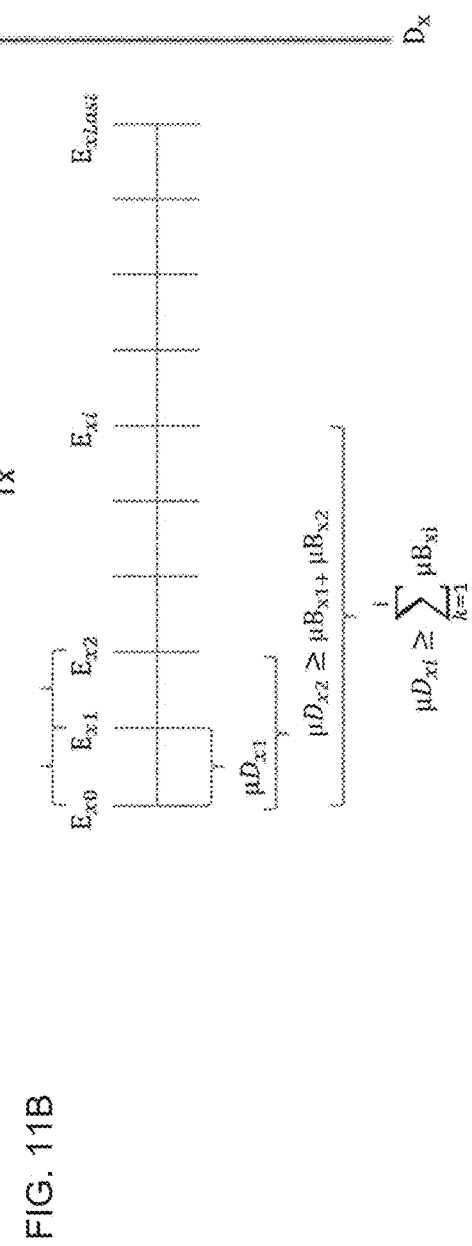
FIG. 11B shows a timing diagram of an execution of task $T_x$ having a deadline $D_x$.

In one example of step 132, the reference timing may be a micro deadline. Hence the reference timing of micro task $\mu T_{xi}$ includes a micro deadline $\mu D_{xi}$, which specifies a response time up to which an execution of micro task $\mu T_{xi}$ should be finished, wherein the response time is a duration relative to an activation time $ATT_x$ of the task $T_x$. Based on the determined micro budgets, micro deadlines $\mu D_{xi}$, are determined as shown in FIG. 9 and FIG. 11B, wherein the micro deadline of $\mu D_{xi}$ is a time relative to the start of task $T_x$ and is larger or equal than the sum of micro budgets on any path from the start of the task to the end of micro task $\mu T_{xi}$, where event $E_{xi}$ is emitted. Since there may be several possible control flow paths from the start of $T_x$ to the end of $\mu T_{xi}$, the micro deadline $\mu D_{xi}$ is determined based on the longest such path, wherein length may be determined, for example, according to the sum of micro budgets of micro tasks $\mu T_{xk}$ on a path from the start to $\mu T_{xi}$. One example execution is illustrated in FIG. 11B, which also shows a formula according to which $\mu D_{xi}$ is determined. Hence, the following terminology and identifiers are defined:

$\mu D_{xi} \geq \Sigma_{k=1}^{i} \mu B_{xi}$: the sum on the right hand side is thus a lower bound for the micro deadline $\mu D_{xi}$.

Hence micro task $\mu T_{xi}$ should preferably be finished until each micro task $\mu T_{xk}$ $k \in \{1, \ldots, i\}$ on a critical path from an initial micro task $\mu T_{x1}$ to micro task $\mu T_{xi}$ has finished execution, wherein the execution time of each micro task $\mu T_{xk}$ is preferably estimated by its micro budget $\mu B_{xk}$, wherein the real-time constraints of task $T_x$ are not met with a probability above the tolerance boundary if the actual timing at the end of micro task $\mu T_{xi}$ exceeds the time by which micro task $\mu T_{xi}$ should have preferably been finished, wherein the critical path to micro task $\mu T_{xi}$ is a path among all possible execution paths of $T_x$ from an initial micro task to micro task $\mu T_{xi}$ which has the longest predicted execution time. Specifically, according to the above formula, the micro deadline $\mu D_{xi}$ is at least the sum of micro budgets $\mu B_{xi}$ of micro tasks $\mu T_{xk}$, $k \in \{1, \ldots, i\}$ on the critical path to micro task $\mu T_{xi}$.

The start of task $T_x$, may thereby be specified as a start time $S_x$, which is the time at which event $E_{x0}$ is emitted. Alternatively, the start time of a task may be specified as the activation time of $T_x$, which is $ATT_x$. In both cases, times are specified as wall clock times. The activation time $ATT_x$ specifies a time at which task $T_x$ is ready to execute, which is, for example, the time at which possible dependences of the task to other tasks are fulfilled. The start time $S_{Tx}$ specifies the time when the task $T_x$ actually starts execution, i.e., the time at which it is actively executing. The start time may thus be a later point in time than the activation time $ATT_x$, wherein the delay of the start is also referred to as jitter $J_{Tx}$, such that $S_{Tx} = ATT_x + J_{Tx}$.

For the purpose of the model described herein, it may be assumed that the deadlines of a task $T_x$, including micro deadlines $\mu D_{xi}$, are specified relative to the activation time $ATT_x$. Alternatively or in addition, if the system, for example the OS scheduler, guarantee that there is an upper bound for the jitter $J_{Tx}$ and that after starting $T_x$, event $E_{x0}$ is emitted in any case before the scheduler chooses another task on the same execution unit for execution, the deadlines of a task $T_x$, including micro deadlines $\mu D_{xi}$, may be specified relative to the start time $S_{Tx}$.

In another example of step 132, the reference timing is a planned activation budget $B_{WCET,xi}$ for micro task $\mu T_{xi}$. A planned activation budget specifies a duration, in the sense of CPU time—not wall clock time, that is sufficient to complete the execution of task $T_x$ starting from micro task $\mu T_{xi}$ onwards such that its real-time constraints are met with a probability above the tolerance boundary. This planned activation budget is determined by the sum of durations of each of the micro tasks $\mu T_{xk}$, $k \in \{i, \ldots, xLast\}$ on the active critical path within $T_x$ starting at micro task $\mu T_{xi}$. This determination is described in detail in the following with reference to FIG. 12 and FIG. 15. In this example of step 132, the reference timing of micro task $\mu T_{xi}$ includes a planned activation budget $B_{WCETxi}$ which specifies an execution time budget that is sufficient to complete the execution of task $T_x$ starting from micro task $\mu T_{xi}$ such that its real-time constraints are met with a probability above the tolerance boundary, wherein the execution time budget is determined based on the micro budgets $\mu B_{xk}$ of the each of the micro tasks $\mu T_{xk}$, $k \in \{i, \ldots, xLast\}$ on an active critical path within $T_x$ starting at micro task $\mu T_{xi}$; wherein the active critical path starting at micro task $\mu T_{xi}$ is a path among all possible execution paths of $T_x$ from $\mu T_{xi}$ to a final micro task $\mu T_{xLast}$ which has the longest predicted execution time, wherein the real-time constraints of task $T_x$ are not met with a probability above the tolerance boundary if, before execution of micro task $\mu T_{xi}$, the actual response time of micro task $\mu T_{xi-1}$ is larger than the micro deadline $\mu D_{xi-1}$. In this case, more execution time than specified by the planned activation budget $B_{WCET,xi}$ may have to be reserved until the deadline of task $T_x$.

Figure 12:
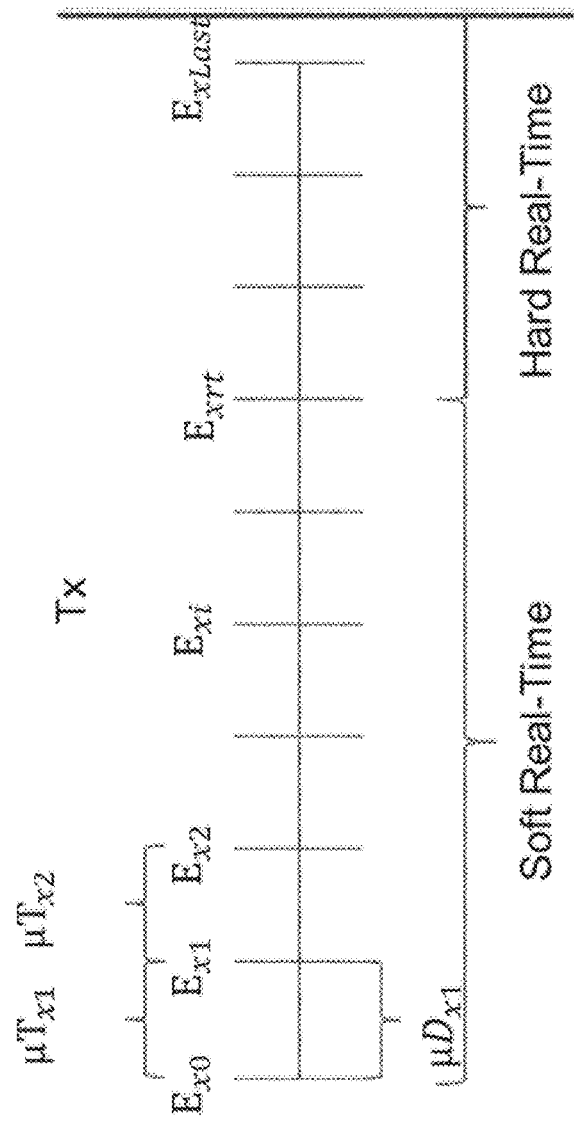
FIG. 12 shows the timing diagram of a task $T_x$ where micro tasks are categorized in soft-RT and hard-RT.

FIG. 12 shows that the micro tasks $\mu T_{xk}$, $k \in \{i, \ldots, xLast\}$ on a path from the start to the end of the task $T_x$ fall into two categories, namely soft real-time, soft-RT, and hard real-time, hard-RT, micro tasks. This categorization is determined as follows: Following the control flow of the execution and the sequence of micro tasks along that flow which is shown in FIG. 12 from left to right, the first task $\mu T_{xrt}$ for which the probability to meet its micro deadline $\mu D_{xrt}$ falls below the desired tolerance boundary. The budget for each micro task is chosen such that said micro task completes with a probability of $P_{thr}$ within that budget. Intuitively, the following holds: At the start of the execution of a task $T_x$, i.e., with a large number of micro tasks remaining to be executed, the overall probability that each micro task along the execution of $T_x$ takes longer than its corresponding budget quickly becomes very small the more micro tasks remain for execution; for example if $P_{thr}=0.75$ for each micro task, then the probability that one micro task does not terminate within the provided execution budget is 0.25. The overall probability at the beginning of the first micro task that two micro tasks in a row do not finish with their budgeted execution time becomes p=0.25*0.25=0.0625. Thus, the more micro tasks are still ahead to be executed, the lower the probability, when starting from the first micro task, that the deadline of the last micro task is missed. In particular, the overall, i.e., combined probability for a sequence of k micro tasks is $(1-P_{thr})^k$, which becomes very small as k grows, which is expressed in the following formula:

$$\text{Prob}(CT_{ExLast} > D_x) = (1-P_{thr})^{\#Events}$$

Wherein $CT_{Exi}$ denotes an actual point in time relative to the start of the task $T_x$ when $E_{xi}$ is signaled.

Events denotes the number of events in an execution.

Conversely, if few micro tasks remain, the probability of not meeting the deadline of the task may by larger and even may become larger than the tolerated risk of not meeting the deadline, which has correspondence to a minimum service guarantee. These probabilities are shown in FIG. 15 in the last column of the spreadsheet "residual probability of missing the deadline". At a certain point during the execution, there may not be a sufficient number of micro tasks remaining to "compensate" for the fact that the reserved budget for each of the remaining micro tasks merely ensures with a probability of $P_{thr}$ that the corresponding micro task completes within its budget, the probability $P_{thr}$ being significantly below 1.0, for example 0.75 in FIGS. 14 and 15, and also below the certain minimum service guarantee, which is for example $(100-10^{-9})\%$. In FIG. 15, this point is reached after event 43, where the probability of missing the deadline (last column) increases above $10^{-11}$. Hence the method disclosed herein adds to the last micro tasks $\mu T_{xrt}$ to $\mu T_{xlast}$, which are shown in FIG. 15 in the area "Hard RT", along an execution path of task Tx, which is in this case the critical path, an additional execution time, so called buffer time, to the budgets $B_{WCET,xrt}$ to $B_{WCET,xlast}$ of the respective micro tasks. This additional time budget is the difference between the micro budget $\mu B$ for the respective micro tasks as discussed above and the WCET of the respective micro tasks. This buffer time is denoted for micro task $\mu T_{xk}$ as $BT(\mu T_{xk})$.

An execution time of a soft real-time micro task $\mu T_{xi}$ is estimated by its micro budget $\mu B_{xi}$. An execution time of a hard real-time micro task $\mu T_{xi}$ is estimated by its micro budget $\mu B_{xi}$ plus a buffer time $BT(\mu T_{xi})$, the buffer time being an additional time to guarantee that $\mu T_{xi}$ finishes with 100% certainty within the time estimated. For determining a planned activation budget $B_{WCETxi}$, the execution time budget is based on a sum of the estimated execution times of soft real-time and hard real-time micro task $\mu T_{xi}$. This is also expressed in the formula below.

The following terminology and identifiers are defined and used FIG. 12 and in following:

WCET($\mu T_{xi}$) is the WCET determined for $\mu T_{xi}$.

$BT(\mu T_{xi})$=WCET($\mu T_{xi}$)–$\mu B_{xi}$ (buffer time for $\mu T_{xi}$) is an additional budget which is necessary in addition to $\mu B_{xi}$ to provide a 100% guarantee that the micro deadline $\mu D_{xi}$ can be met.

$E_{xrt}$ denotes the first event with a hard real-time deadline $\mu D$. As of this event, the probability that the remaining micro tasks in the execution of $T_x$ meet their corresponding micro deadlines becomes lower than the minimum required service guarantee, since the micro deadlines are determined based on the micro budgets.

$B_{WCETx}$ denotes the required CPU budget of task x, to meet its deadline $D_x$ within the minimum required service guarantee.

$B_{WCExi}$ denotes the worst case CPU budget which is sufficient to complete the execution of remaining micro tasks before the deadline $D_x$ with a probability larger or equal that the minimum required service guarantee.

CP events$_x$ denotes the number of events that are included in the longest a critical path of $T_x$.

ACP events$_x$ denotes the number of remaining events on the critical path of $T_x$ starting from event $E_{xi}$ up to event $E_{xlast}$.

The required CPU budget of task $T_x$ is thus calculated as follows:

$$B_{WCETx} = \sum_{k=0}^{\#CP\ events_x} \mu B_{xk} + \sum_{k=rt}^{\#CP\ events_x} (BT(\mu T_{xk}))$$

The worst case CPU budget for a micro task is calculated as follows:

$$B_{WCETxi} = \sum_{k=i}^{\#ACPevents_x} \mu B_{xk} + \sum_{if(i \geq rt)k=i}^{\#ACPevents_x} (BT(\mu T_{xk}))$$

$$= \sum_{k=i}^{While(E_{xk} \neq E_{xrt})} \mu B_{xk} + \sum_{if(i \geq rt)k=i}^{\#ACPevents_x} \mu BT_{xk} + \sum_{if(i \geq rt)k=i}^{\#ACPevents_x} (BT(\mu T_{xk}))$$

$$= \sum_{k=i}^{While(E_{xk} \neq E_{xrt})} \mu B_{xk} + \sum_{if(i \geq rt)k=i}^{\#ACPevents_x} WCET(\mu T_{xi})$$

$$= SoftB_{Txi} + HardB_{Txi}$$

Hence, for a micro task $\mu T_{xi}$, the worst case CPU budget $B_{WCETxi}$ has two components namely a soft real-time and a hard real-time component according to the above.

Accordingly, for a task $T_x$, the required CPU budget can also be split into hard and soft real-time components corresponding to the above calculation for each micro task, so that:

$$B_{WCETx} = SoftB_{WCETx} + HardB_{WCETx}$$

Both examples of step 132 may also be combined, i.e., the reference timing information includes micro deadlines according to the first example and also budgets and buffer times according to the second example. The reference timing information determined in step 132 is associated with the respective micro task $\mu T_{xi}$ in the execution model of task $T_x$ to obtain the real-time reference model for task $T_x$.

In summary, step 130 achieves that for each micro task $\mu T_{xi}$, $i \in \{1, \ldots, n\}$ a micro budget $\mu B_{xi}$ is determined which is smaller than the worst case execution time, WCET, of micro task $\mu T_{xi}$. Finally, the calibration should be renewed, i.e., step 130 is to be repeated, whenever the program of a task is changed. The calibration step 130 may also be repeated when the task allocation determined in step 120 is changed, since such change could impact the resource sharing and possibly lead to changes in the statistical execution times which are a basis for determining micro budgets, micro deadlines etc.

Referring to step 140 in FIG. 4. For each execution unit and given the allocation determined in step 120 and the real-time reference models determined in step 130, a total utilization of the execution unit can be determined based on the calculated worst case CPU budget for each task which fall into budget components for soft real-time and hard real-time micro tasks. Hence for each execution unit, for example a CPU core, the total reservation of execution time for hard and soft real-time micro tasks on an execution unit $CORE_y$, may be determined as described in detail below.

The selection of tasks to allocate on a specific execution unit $CORE_y$ may be determined through varying the allocated real-time tasks and maximizing the time reserved for real-time tasks on $CORE_y$, i.e., to determine $MAX(B_{COREy})$ under the following constraint, which must be met for a permissible allocation:

At any time, $MAX(B_{COREy})$ should be lower than the maximum utilization of the execution unit.

Figure 18:
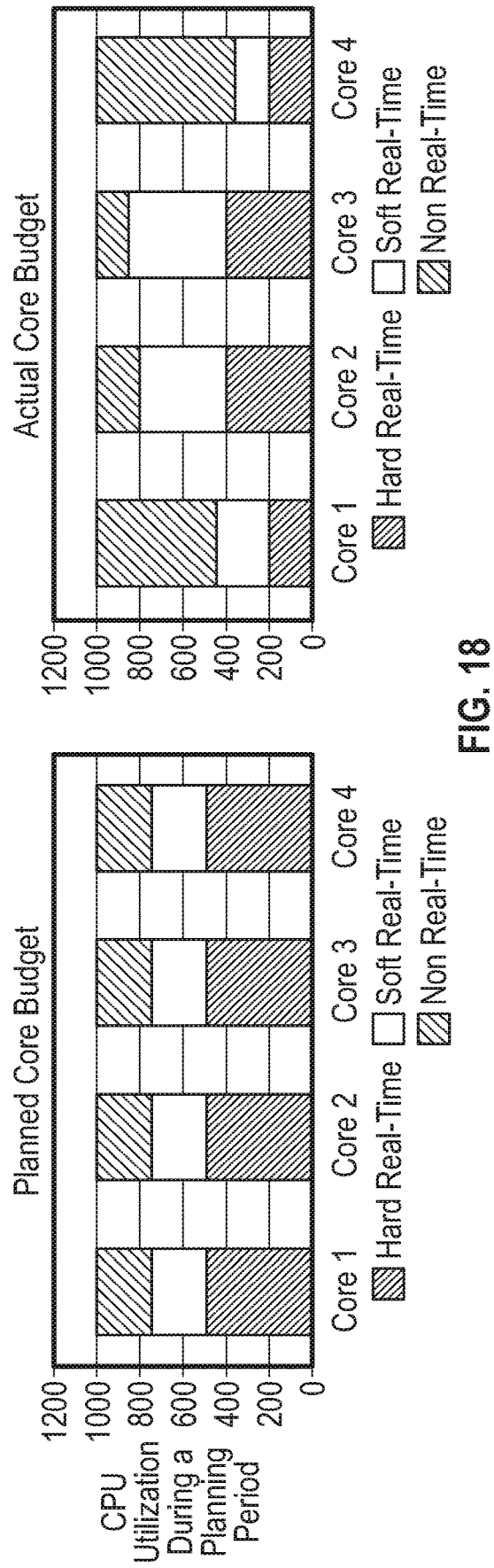
FIG. 18 shows planned core budgets for hard-RT and soft-RT micro tasks within a planning period on multiple CPU cores and actual core budgets within the planning period.

Hence, assuming that the budget $B_{WCETx}$ of task $T_x$ is the planned activation budget $B_{WCETx1}$ of the initial micro task $\mu T_{x1}$ of task $T_x$, a plurality of tasks may be allocated on the a same execution unit as long as the following constraints are met: the sum of estimated execution times for the hard-RT micro tasks of each task of the plurality of tasks does not exceed a certain first portion of the a maximum utilization of the execution unit during the planning period; and the sum of the budgets of the RT-tasks allocated to the same execution unit does not exceed a certain second portion of the maximum utilization of the execution unit during the planning period. In FIG. 18, for example, the first portion is 50%, and the second portion is 75%.

In one example, the planned core budget $B_{COREy}$ includes a planned core budget for hard real-time micro tasks $HardB_{COREy}$ on $CORE_y$ and a planned core budget for soft real-time micro tasks $SoftB_{COREy}$ on $CORE_y$, wherein $HardB_{COREy}$ is the sum of planned budgets of micro task $\mu T_{xi}$ in the hard real-time category for all active real-time tasks $T_x$ allocated to $CORE_y$, and wherein $SoftB_{COREy}$ is the sum of planned budgets of micro task $\mu T_{xi}$ in soft real-time category for all active real-time tasks $T_x$ allocated to $CORE_y$.

A real-time task $T_x$ is active if the following two conditions are met: First, the execution of task $T_x$ has already started, i.e., the trace event $E_{x0}$ has been emitted, and second the last emitted event is not $E_{xLast}$, i.e., the task $T_x$ has not yet finished. Some of the tasks allocated to an execution unit may not be active in that sense, for example, if their synchronization or communication dependences with other tasks are not yet fulfilled. For example in FIG. 8 in the left part of the figure, task T2 may not execute beyond point $t_{21}$ unless message m2 is available to be read from the shared object. If the sending task T1 has not progressed up to the point of providing message m2 through the shared object, then task T2 may temporarily not be active, namely until message m2 is available. In some examples, the active real-time tasks can be the allocated real time tasks.

The planned core budgets provide an upper bound for the execution time that is required to complete all active RT tasks in time with the minimum service guarantee.

In the following the method according to the second phase 200 of FIG. 1 is described.

Figure 13:
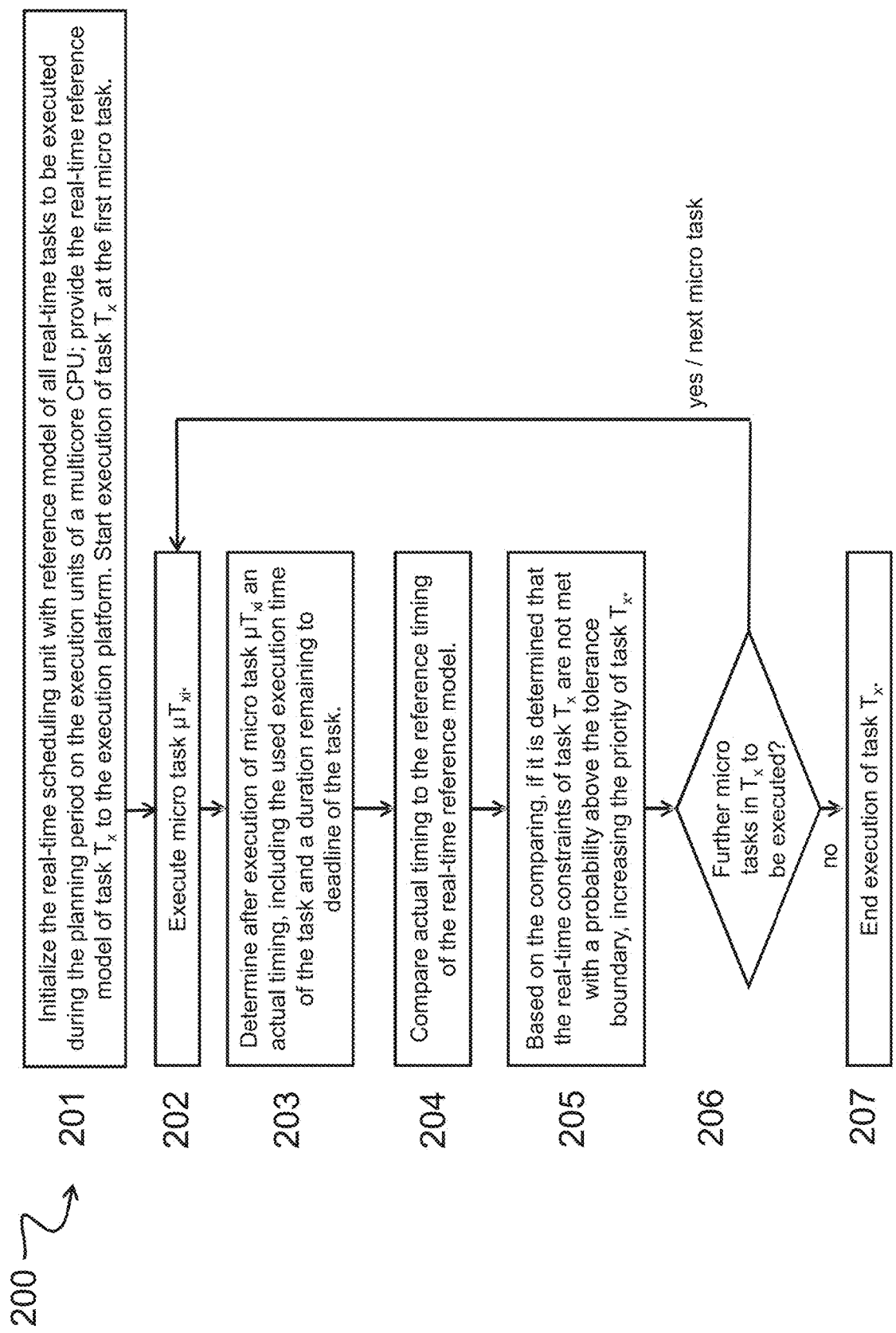
FIG. 13 shows a flowchart which details the step of executing a real-time task under real-time constraints.

FIG. 13 shows a flowchart which details step 200 of executing a real-time task $T_x$ under real-time constraints.

The concepts and the method of step 200 are illustrated on an example real-time task and execution which is specified in FIG. 14 to FIG. 18.

FIG. 14 shows a table that specifies the parameters of a model of a real-time task $T_x$ having 60 micro tasks on its active critical path from the start of $T_x$, 17 of which fall into the hard-RT category. The micro tasks are uniform, having each a micro budget for the execution time of 8 units, WCET of 32 time units, and thus a buffer time of 24 time units, wherein the micro budget is has been determined based on a threshold probability of 0.75.

FIG. 15 shows a table with timing information for an execution of $T_x$ with micro tasks according to the parameters of FIG. 14 starting with soft-RT and ending with hard-RT tasks. The execution shown corresponds to the execution along the active critical path from the start of $T_{x..}$.

Figure 16:
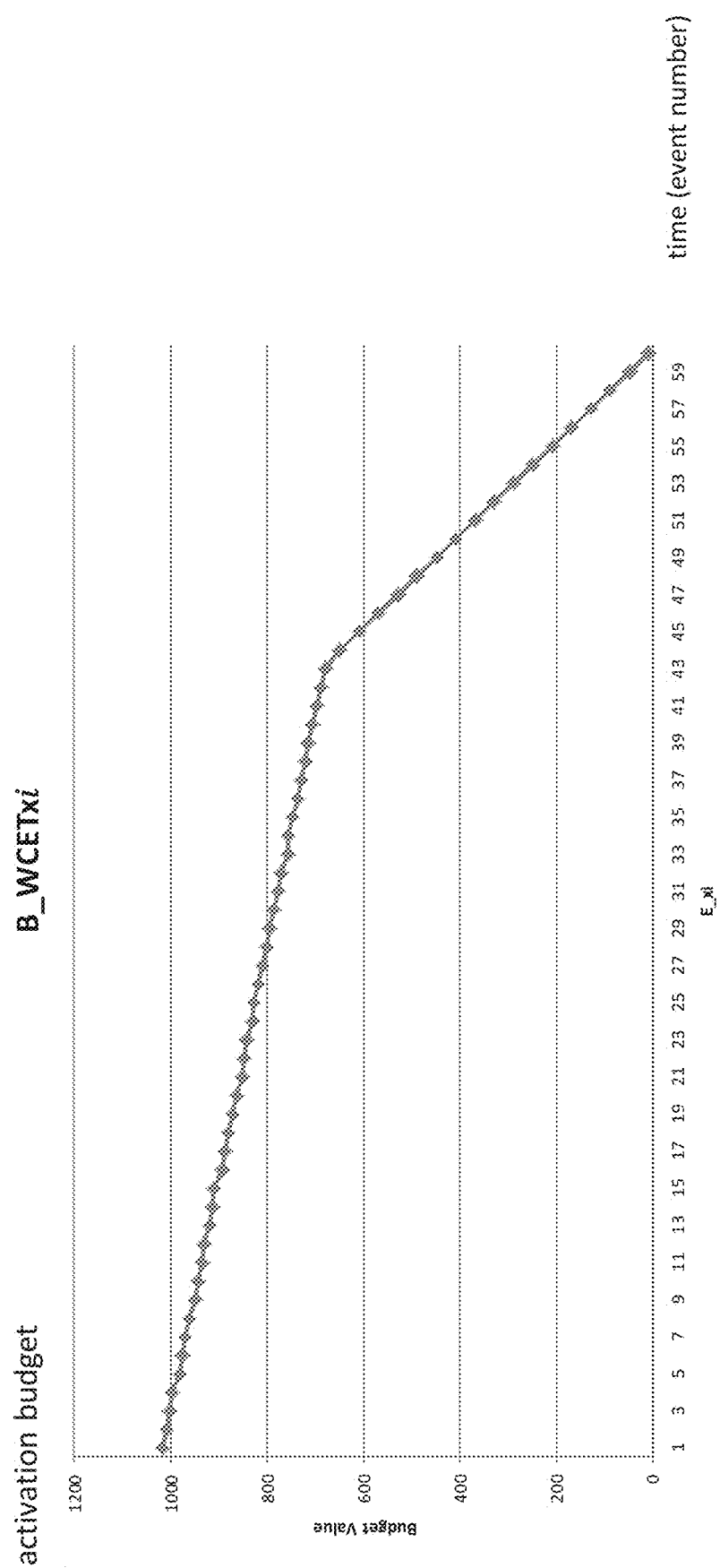
FIG. 16 shows a graph of the planned activation budget $B_{WCET,xi}$ at different stages during the execution of $T_x$ corresponding to events $E_{xi}$ according to the execution and timing shown in FIG. 15.

FIG. 16 shows a graph of the planned activation budget $B_{WCETxi}$ at different points in time i corresponding to events $E_{xi}$. FIG. 16 shows a decrease in the activation budget of each micro task starting at $\mu T_{x1}$ to $\mu Tx_{60}$. According to the above, larger budgets are reserved for hard-RT tasks, which are $\mu Tx_{44}$ to $\mu Tx_{60}$, since the budget of these tasks also include the buffer times. The diagram corresponds to the values in the fourth column in the table of FIG. 15.

Figure 17:
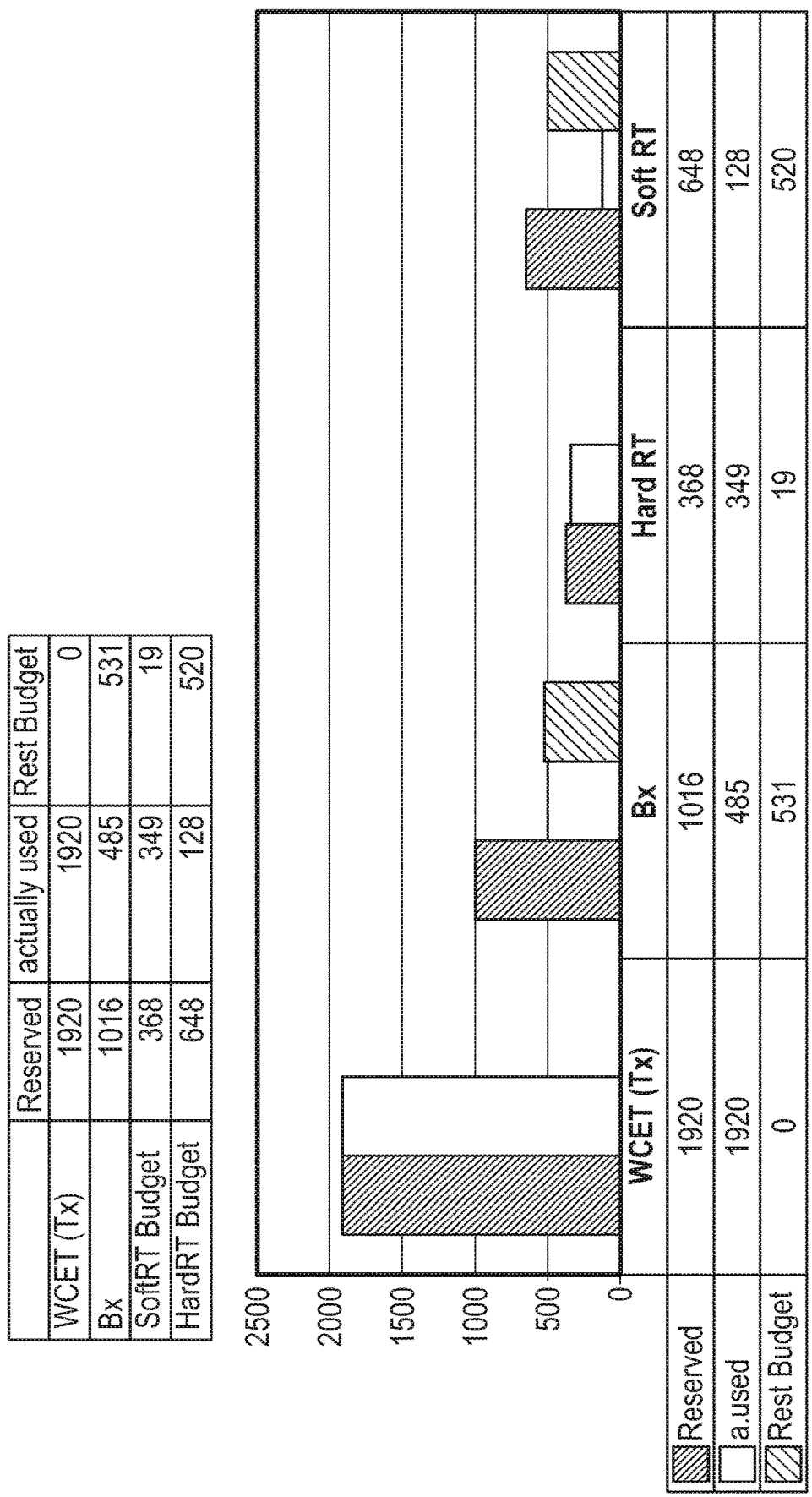
FIG. 17 shows a worst-case budget reservation WCET $(T_x)$ as done by a conventional method for executing and scheduling real-time tasks. Furthermore, the figure shows the budget $B_x$ which would be reserved according to the method provided herein. $B_x$ has a component which concerns the reservation of execution time for soft-RT micro tasks and another component which concerns the reservation of execution time for hard-RT micro tasks. The sum of these reservations result in the overall budget $B_x$.

FIG. 17 shows a worst-case budget reservation WCET $(T_x)$ as done by a conventional method for executing and scheduling real-time tasks. Furthermore, FIG. 17 shows the budget $B_x$ which would be reserved according to the method provided herein. $B_x$ has a component which concerns the reservation for soft-RT micro tasks and another component which concerns the reservation for hard-RT micro tasks. The sum of these reservation result in the overall budget $B_x$. FIG. 17 further shows which fraction of the reserved budget has actually been spent, i.e., was needed, in the execution of FIG. 15, specifically the timing specified in the second column of the table in FIG. 15. The remainder, i.e., the difference between the initial reservation and what was needed for execution is shown as rest budget, which is available for execution of other tasks.

At step 201, the real-time scheduling unit is initialized, wherein the real-time reference model of task $T_x$ is provided to the target hardware and stored in the "GRTM/GATM" storage unit which enables efficient access to the real-time reference model of task $T_x$ by the real-time scheduling unit. In step 201, the execution of task $T_x$ starts at the first micro task $\mu T_{x1}$. At the beginning of $\mu T_{x1}$ a start trace event $E_{x0}$ is issued. Emission of an event leads to an update of the partial actual timing state (PATS) comprising, for each task $T_x$, a most recently emitted trace event $E_{xi}$ including a point in time $CT_{Exi}$ when the trace event is emitted. Hence, after execution of micro task $\mu T_{xi}$, an actual timing is determined, which may be a response time from the activation of task $T_x$ to the end of micro task $\mu T_{xi}$.

The event monitoring unit is responsible to create and update the CPU wide global actual timing model (GATM). Specifically, the event monitoring unit obtains in the most events recorded in the partial actual timing state (PATS), preferably in regular intervals. Specifically, for each task $T_x$ and each execution unit $CORE_y$, the budget values $B_x$ and $B_{COREy}$ are kept current based on progress observed via the events issued by the tasks and obtained by the event monitoring unit. In one example, the execution time reserved by a scheduler on an execution unit is the sum of $HardB_{WCETk}$ and SoftB$_{WCETk}$ of all active tasks allocated to this execution unit. Correspondingly, the reserved execution time B$_{COREy}$ for execution unit CORE$_y$, falls into a component for hard-RT and soft-RT micro tasks. As micro tasks are executed and complete, the event monitoring unit determines the execution times taken for each micro task. If the actual execution time of a micro task has been less than the budget reserved for the micro task, the excess budget can be released, which means that the scheduler releases the reservation and hence can make additional execution time available to other tasks. The hard-RT and soft RT component of B$_{COREy}$, depending on whether the micro task is in the hard-RT or soft-RT category, is reduced correspondingly based on the determined execution time of the micro task used and/or the released time.

Hence in one embodiment, if a difference between an actual activation time of micro task $\mu T_{xi}$ and a planned activation time of micro task $\mu T_{xi}$ is negative, a portion of the execution time within the planning period reserved on the execution unit for the execution of a task $T_x$ with real time constraints is released and thus available for the execution of other tasks, wherein the planned activation time of micro task $\mu T_{xi}$ is the micro deadline $\mu D_{xi-1}$ of the preceding micro task $\mu T_{xi-1}$, and wherein the amount of released time is lower or equal to the difference between the actual time remaining until the deadline of $T_x$ and the planned activation budget B$_{WCETxi}$.

The global actual timing model (GATM) is preferably managed and updated by the event monitoring unit. The GATM includes, for each task $T_x$ and each execution unit CORE$_y$, current values of B$_x$ and B$_{COREy}$, which aare maintained current, hence "global" actual timing model.

Furthermore, the event monitoring unit "accumulates" the values of all partial actual timing states (PATS) that are observed since the system start. The value of B$_x$ specifies initially, i.e., before execution of $T_x$ starts, B$_{WCETx}$ as determined during phase I in step 100.

On the example task and execution which is considered here for illustration, the initial reserved budget value is shown in FIG. 17 as B$_x$ in the "Reserved" column. As discussed before, the total budget B$_x$ has a component which concerns the hard-RT and the soft-RT budget. For example, the value 368 is shown as reserved "SoftRT Budget" as initial value in the first line, fifth column of FIG. 15 with title "B_Softxi". During the course of execution, the event monitoring unit subsequently reduces this budget by subtracting the actual execution time taken by a micro task and a correction amount $\Delta S_{\mu Txi}$ which specifies whether the micro task started early or late.

$\Delta S_{\mu Txi} = CT_{E_{xi-1}} - \mu D_{xi-1}$ denotes a difference, i.e., a correction amount, between a planned activation time of micro task $\mu T_{xi}$ according to the real-time reference model, which is the micro deadline $\mu D_{xi-1}$, and the actual activation time of $\mu T_{xi}$, which is $CT_{E_{xi-1}}$. The value is negative if $\mu T_{xi}$ starts earlier than planned, otherwise zero or positive.

Furthermore, an actual activation budget of micro task $\mu T_{xi}$ is the planned activation budget B$_{WCETxi}$ preferably corrected by $\Delta S_{\mu Txi}$. This is shown also in FIG. 15, where the execution proceeds by descending along the rows from the top to the bottom of the table and where the values in the fifth column are reduced stepwise by the actual timing according to which the task makes progress. The difference between subsequent rows is determined by the execution time of a micro task and the correction amount in the third column.

As soon as the event monitoring unit has updated the GATM, the deadline monitoring unit, the budget time monitoring unit, and the core interference manager are informed. In response, these units may for example cause increase of the priority of a task as has been mentioned above and as will be discussed in more detail below.

In step 202, a micro task is executed, so that the respective trace event at the end of the micro task is issued.

In step 203, an actual timing, including the used execution time of the task and respectively its micro tasks, and a duration remaining to the deadline of the task, is determined after execution of micro task $\mu T_{xi}$. The actual timing may also include a response time from the activation and/or start of task $T_x$ to the end of micro task $\mu T_{xi}$. The event $E_{xi}$ includes a current timestamp that specifies the time at which the end of $\mu T_{xi}$ is reached, information about the start of task $T_x$ is included in the GATM based on the accumulated partial real-time states.

In step 204, an actual timing is compared to a reference timing. In one embodiment, in step 204, the actual timing obtained in step 203 and which led to an update of the GATM, is compared to the reference timing included in the global reference timing model GRTM. This comparison is done by the deadline monitoring unit which preferably has very efficient access to the GRTM/GATM storage unit. Specifically the operation of the deadline monitoring unit and the access to the GRTM/GATM storage should preferably not negatively affect or delay the normal operation of the processor, e.g. by sharing resources with execution units that execute real-time tasks. To perform the comparison, the deadline monitoring unit obtains from the GRTM a reference timing value, which could be according to the above, a micro deadline, or an activation budget value of a micro task or combinations thereof. The reference time may, for example, be a planned remaining execution time of a task starting at micro task $\mu T_{xi}$, which is expressed as activation budget B$_{WCETxi}$. For determining whether the priority of a task is to be increased, a difference between said reference time and the remaining wall-clock duration $D_x$–CT to the deadline $D_x$ of the task may be determined, wherein CT is the current wall clock time, e.g. specified relative to the start of the task. For example, if it is determined that the wall clock duration until the deadline of the task is only slightly higher or equal to the activation budget, which is a predicted execution time until the end of the task according to the real-time reference model, then the priority of this task vs. other concurrent tasks on the same execution unit is likely to be increased as discussed in the following.

In step 205, on the basis of this reference timing value and of deviations between the planned values and the actual values obtained from the GATM and determined by the comparing in step 204, the deadline monitoring unit informs the HW scheduling unit, for example to increase the priority of a task. Specifically, based on the comparing, if it is determined that the real-time constraints of task $T_x$ are not met with a probability above the tolerance boundary, the priority of task $T_x$ is increased. In one example, the HW scheduling unit is designed to generate a real-time control value for a task $T_x$ based on a deviation of the planned timing of $T_x$ from the actual timing of task $T_x$ on the execution unit, specifically the actual timing of a most recently finished micro task $\mu T_{xi}$ of $T_x$. The HW scheduling unit is further designed to signal the real-time control value to an OS scheduler.

In another example, the budget time monitoring unit is further designed to determine, for each CORE$_y$ of the one or more execution units, an actual core budget, being a reservation of execution time for all real-time tasks allocated to CORE$_y$, and possible deviations between said actual core budget and a planned core budget $B_{COREy}$, wherein the actual core budget is the execution time on $CORE_y$ that is reserved at a certain point of time within the planning period.

For the purpose of determining the actual core budget, an activation budget of a real-time task is an estimated timing of the real-time task such that all possible continuations of executions of the real-time task meet the real-time constraints of the real-time task with a probability above a tolerance boundary during a planning period. Thereby the actual core budget is determined as the execution time on $CORE_y$ that is reserved at a certain point in time within the planning period, which is preferably estimated, for example, based on the micro budgets $\mu B_{xi}$ of all micro tasks $\mu T_{xi}$ of all active real-time tasks $T_x$ allocated to $CORE_y$ at any in point in time within the planning period.

For the purpose of determining the planned core budget $B_{COREy}$, the planned budget of real-time tasks may be the execution time allocated by a task scheduler, e.g. in the OS, for the active real-time tasks on $CORE_y$ during a planning period. Thereby the planned core budget $B_{COREy}$ of an execution unit $CORE_y$ specifies an upper bound for the execution time that is required to complete all active real-time tasks in time with the minimum service guarantee, wherein the planned core budget may be determined as a maximum utilization of an execution unit during each planning period for micro tasks in the hard-RT or soft-RT category respectively over all planning periods considered during the calibration phase of a program including the real-time tasks. In some examples, the planned core budget $B_{COREy}$ of an execution unit $CORE_y$ may be estimated as a maximum utilization of an execution unit during each planning period for micro tasks in the hard-RT or soft-RT category respectively over all planning periods considered during the calibration phase of a program including the real-time tasks. Alternatively, $B_{COREy}$ may also be determined using conventional methods of schedulability analysis based on micro bugets. In another example, the planned core budget may be the maximum CPU time reserved within a planning period, considering any of the planning periods during a calibration run. In some examples, the planned core budget $B_{COREy}$ may be estimated based on the micro budgets $\mu B_{xi}$ of all micro tasks $\mu T_{xi}$ of all active real-time tasks $T_x$ allocated to $CORE_y$ during a planning period.

Furthermore in another example, also in step 205, the core interference manager, for example may adjust processor internal priorities of using shared resources such as L2 cache or interconnect or may temporarily suspend the operation of specific execution units, for which all allocated tasks have made sufficient progress. For example the core interference manager may send core penalty signals to execution units other than $CORE_y$ if the actual use of execution time for real-time tasks on $CORE_y$ exceeds the planned budget $B_{COREy}$. In other words, the core interference manager may send core penalty signals if the actual core budget for $CORE_y$ exceeds the planned core budget $B_{COREy}$, wherein the core penalty signals are sent to one or more other execution units $CORE_z$ for which a planned core budget $B_{COREz}$ exceeds an actual core budget for $CORE_z$, the core penalty signals causing, when received by the one or more other execution units, the one or more other execution units to be de-prioritized for a predefined period of wall clock time. Thereby de-prioritizing may include halting the execution unit for a predefined period of wall clock time. In some examples, the core penalty signal targeted to an execution unit of the one or more other execution units is sent only at a point in time which is non-critical for the target execution unit, wherein a point in wall clock time at an execution unit to which the core penalty signal is targeted is non-critical if said execution unit is not reserved for execution of hard real-time micro tasks from said point in wall clock time for the predefined period of wall clock time.

The core penalty signals cause, when received by the other execution units, the other execution units to be de-prioritized, preferably for a predefined period of wall clock time. The purpose of such core penalties is to avoid core delay or starvations for shared chip-resources (e.g. interconnect bandwidth). As a result of a core penalty the software execution on the affected core is halted preferably for the predefined period of time. Thereby, a core penalty signal is only sent to other execution units $CORE_z$ at points in time that that are non-critical for $CORE_z$. A non-critical point of time is a world clock time value, wherein, for the duration of the penalty, the real-time behavior on that core is not affected, e.g. when no hard-real-time micro task is running, scheduled, or activated during the penalty period. In some cases, this also means that a planned budget $B_{COREz}$ exceeds an actual use of execution time for real-time tasks on $CORE_z$.

Furthermore in another example, also in step 205, a portion of the execution time within the planning period reserved on the execution unit for the execution of a task $T_x$ with real time constraints may be released according to the above.

When the hardware scheduling component is informed to increase priority of task, it may be decided by how much the priority is to be increased. The goal of step 205 and the method overall is to cause adjustments of the scheduling in a way that makes the actual timing behavior of tasks as close as possible to the planned behavior specified in the global reference timing model (GRTM). Hence the hardware scheduling unit decides based on a difference, which is determined according to the above, which tasks are to be executed with higher priority. For this decision, a scheduling method with dynamic priorities, such as, for example, earliest deadline first (EDF) or least lexity first (LLF) may be used. The control values generated by the hardware scheduling unit are communicated, for example, to the operating system scheduler.

The scheduler ensures that, for every active real-time task $T_x$, the following conditions are met at any time:
$D_x - CT - B_{WCETxi} > 0$ and
the smaller the difference $(D_x - CT - B_{WCETxi})$, the higher the priority.

Finally, referring to the method illustrated in FIG. 13, in step 206, if further micro tasks remain in the current task to be executed, then the method iterates back to step 202 for the next micro task. Otherwise the execution of task $T_x$ ends in step 207. In another embodiment, the steps 203, 204, 205 may not be repeated after execution of each micro task but in predetermined intervals until the execution of the plurality of tasks is terminated, wherein the predetermined intervals are preferably regular.

FIG. 18 shows planned core budgets for hard-RT and soft-RT micro tasks on multiple CPU cores and actual budgets of execution times of the active tasks, wherein portions of the planned hard-RT and soft-RT budget may be released for non-RT tasks. FIG. 18 shows for example that the large budgets for hard RT tasks are typically not fully used due to the very conservative calculation of the buffer times based on WCET estimation. The actual hard RT-budgets used will thus always be lower or equal, and typically lower, than the budget initially reserved, which is the planned core budget. The planned core budgets are determined, for example, during a calibration phase or using conventional schedulability analysis. The calibration thereby considers a duration over the entire execution of a program including the one or more real time tasks, wherein this duration is partitioned into one or more planning periods. The planned core budget for hard-RT micro tasks specifies a safe estimation of CPU utilization that is sufficient in any planning period, which could for example be the maximum CPU utilization observed for hard RT micro tasks during any of the planning periods during the entire execution of the program. Likewise, the planned core budget for soft-RT micro tasks can be determined as the maximum observed CPU utilization for soft-RT micro tasks during said planning periods. Planned core budgets are determined preferably once for a program at the time of program design or during a calibration phase.

When executing the program under real-time constraints and when it is determined that a task completes one of its micro task ahead of the micro deadline of said micro task, then a corresponding reservation of excess execution time for said micro task may be released accordingly and thus made available by the scheduler to the execution of other tasks. Correspondingly, when a micro task in the hard-RT category finishes ahead of its deadline, reserved buffer time for that micro task may successively be released, and thus available by the scheduler for execution of non RT workloads.

FIG. 18 shows further actual core budgets for hard-RT and soft-RT micro tasks on multiple CPU cores. The actual core budgets are preferably determined at the start of each planning period and take into account the real-time tasks which are active during the said planning period, i.e., those tasks which are scheduled to run during the planning period. The actual core budget is the execution time on $CORE_y$ that is reserved at a certain point of time within the planning period, which is preferably estimated, for example, based on the micro budgets $\mu B_{xi}$ of all micro tasks $\mu T_{xi}$ of real-time tasks $T_x$ allocated to $CORE_y$ that are active at any point in time within the planning period. The times used to determine the active core budgets preferably take into account $\Delta S_{\mu Txi}$ for each of the relevant micro tasks, wherein the difference $\Delta S_{\mu Txi}$ may be determined as described before.

FIG. 18 shows further that planned reservations in the soft-RT category may not be sufficient, e.g. in the cases where the actual core budget for execution of micro tasks exceeds the planned core budget, which is in principle possible but unlikely according to the above. This case is shown for Core 2 and Core 3 in FIG. 18. Regarding Core 4, reservations for micro tasks in the soft-RT and hard-RT category have been successively released so the corresponding times have been made available for execution of non-RT tasks by the scheduler without compromising on the real-time properties and guarantees provided to real-time tasks.

On the example of FIG. 18, the core penalty mechanism can be explained as follows: Consider, for example, that a non-RT task is running at Core 4, wherein the RT tasks allocated on Core 4, are good in time, because their actual use of execution time on this execution unit is smaller than the planned budget. Core 4 uses extensively shared chip resources. Then, if, for example, a core budget is exceeded e.g. on Core 3, the execution of non-RT tasks or even soft-RT tasks on other cores, such as Core 4, which are "good in time" should be temporarily halted. When the core budgets of all core reach the values specified in the GRTM, the execution of non-RT and soft-RT tasks on the said executions that for which the allocated tasks are "good in time" should proceed in normal execution mode, i.e., without the execution unit being penalized, de-prioritized or halted.

Embodiments according this disclosure do also include a method and an apparatus that is only concerned with aspects of the first phase according to 100 of FIG. 1 and likewise a method and an apparatus that is only concerned with aspects of the second phase according to 200 of FIG. 1, wherein the each of the first and the second phase comprise the various aspects related to each phase respectively, which have been described above in detail.

It will be understood by the skilled person that the embodiments described hereinbefore may be implemented by hardware, by software, or by a combination of software and hardware. The modules and functions described in connection with embodiments of the invention may be as a whole or in part implemented by microprocessors, computers, or special purpose hardware circuits which are suitably programmed such as to act in accordance with the methods explained in connection with embodiments of the invention.

What is claimed is:

1. A method for executing a program on a computer including a plurality of tasks, wherein one or more tasks of the plurality of tasks have real-time constraints, the method comprising the following steps for each task $T_x$ with real-time constraints:

(a) determining a real-time reference model,
wherein the real-time reference model of task $T_x$ includes a plurality of micro tasks $muT_{xi}$, i where i belongs to integer set $\{1, \ldots, n\}$ which are a partitioning of task $T_x$, and an order among the micro tasks $muT_{xi}$ according to all possible execution paths of task $T_x$, wherein, for each micro task $muT_{xi}$, i where i belongs to integer set $\{1, \ldots, n\}$, a micro budget $muB_{xi}$ which is smaller than the worst case execution time, WCET, of micro task $muT_{xi}$ is determined;

wherein the micro budget $muB_{xi}$ specifies an execution time to complete execution of micro task $muT_{xi}$ with a probability lower than 100% and above a predetermined probability threshold, and wherein the micro budget $muB_{xi}$ of a micro task $muT_{xi}$ is determined on the basis of static analysis and/or abstract interpretation of a program of $muT_{xi}$ and/or statistical analysis of executions of $muT_{xi}$; and wherein, for each micro task $muT_{xi}$, i where i belongs to integer set $\{1, \ldots, n\}$, based on the micro budgets $muB_{xk}$, k where k belongs to integer set $\{1, \ldots, n\}$, a reference timing is determined that specifies an estimated timing of micro task $muT_{xi}$ in any possible execution of task $T_{xi}$ such that all possible continuations of executions of task $T_x$ from micro task $muT_{xi}$ onward meet the real-time constraints of task $T_x$ with a probability above a tolerance boundary, wherein the real-time constraints of task $T_x$ are met with a probability above the tolerance boundary if the execution of task $T_x$ completes before a deadline of task $T_x$ with a probability lower than 100% and above a certain minimum service guarantee;

wherein the reference timing of micro task $muT_{xi}$ includes a micro deadline $muD_{xi}$, which specifies a response time up to which an execution of micro task $muT_{xi}$ should be finished, wherein the response time is a duration relative to an activation time $ATT_x$ of the task $T_x$;

wherein the micro task $muT_{xi}$ should be finished until each of the micro tasks $muT_{xk}$ k where k belongs to integer set $\{1, \ldots, i\}$ on a critical path from an initial micro task $muT_{x1}$ to a micro task $muT_{xi}$ has finished execution, wherein the execution time of each micro task $muT_{xk}$ is estimated by its micro budget $muB_{xk}$;

wherein the real-time constraints of task $T_x$ are not met with a probability above the tolerance boundary if the actual timing at the end of micro task $muT_{xi}$ exceeds the time by which micro task $muT_{xi}$ should have been finished; and wherein the critical path to micro task $muT_{xi}$ is a path among all possible execution paths of $T_x$ from the initial micro task $muT_{x1}$ to micro task $muT_{xi}$ which has the longest predicted execution time;

(b) executing the plurality of tasks and (b1) determining after execution of micro task $muT_{xi}$ an actual timing;

(b2) comparing the actual timing to the reference timing;

(b3) based on the comparing, if it is determined that the real-time constraints of task $T_x$ are not met with a probability above the tolerance boundary, increasing the priority of task $T_x$.

2. The method according to claim 1, wherein the micro tasks $muT_{xi}$ i where i belongs to integer set $\{1, \ldots, xLast\}$ form a lattice with $muT_{x1}$ as an initial micro task of $T_x$ and $muT_{xLast}$ as a final micro task of $T_x$.

3. The method according to claim 2, wherein the micro deadline $muD_{xi}$ is at least the sum of micro budgets $muB_{xi}$ of micro tasks $muT_{xk}$, k where k belongs to integer set $\{1, \ldots, i\}$ on the critical path to micro task $muT_{xi}$.

4. The method according to claim 1, wherein the reference timing of micro task $muT_{xi}$ includes a planned activation budget $B_{WCETxi}$ which specifies an execution time budget that is sufficient to complete the execution of task $T_x$ starting from micro task $muT_{xi}$ such that its real-time constraints are met with a probability above the tolerance boundary;

wherein the execution time budget is determined based on the sum of the micro budgets $muB_{xk}$ of the each of the micro tasks $muT_{xk}$, k where k belongs to integer set $\{i, \ldots, xLast\}$ on an active critical path within $T_x$ starting at micro task $muT_{xi}$;

wherein the active critical path starting at micro task $muT_{xi}$ is a path among all possible execution paths of $T_x$ from $muT_{xi}$ to a final micro task $muT_{xLast}$ which has the longest predicted execution time;

wherein the real-time constraints of task $T_x$ are not met with a probability above the tolerance boundary if, before execution of micro task $muT_{xi}$, the actual response time of micro task $muT_{xi-1}$ is larger than the micro deadline $muD_{xi-1}$.

5. The method according to claim 4 wherein the micro tasks in an execution of task $T_x$ are categorized into soft real-time micro tasks $muT_{xi}$, i where i belongs to integer set $\{1, \ldots, xrt-1\}$ and hard real-time micro tasks $muT_{xi}$, i where i belongs to integer set $\{xrt, \ldots, xLast\}$, wherein an execution time of a soft real-time micro task $muT_{xi}$ is estimated by its micro budget $muB_{xi}$; and wherein an execution time of a hard real-time micro task $muT_{xi}$ is estimated by its micro budget $muB_{xi}$ plus a buffer time $BT(muT_{xi})$, the buffer time being an additional time to guarantee that $muT_{xi}$ finishes with 100% certainty within the time estimated; and wherein the execution time budget is determined further based on a sum of the estimated execution times of soft real-time and hard real-time micro task $muT_{xi}$.

6. The method according to claim 1 comprising the following additional step:

adding one or more instructions to a program of task $T_x$, the instructions causing the emission of a trace event $E_{xi}$ at the end of the execution of micro task $muT_{xi}$, the trace event comprising a unique identifier of a portion of the execution of task $T_x$.

7. The method according to claim 6, wherein the unique identifier comprises an identifier of a hardware unit which executes task $T_x$, an identifier of task $T_x$, and an identifier of the trace event $E_{xi}$.

8. The method according to claim 1, wherein each task of the plurality of tasks is allocated to a fix execution unit during a planning period and the fix execution unit is a core of a plurality of cores of a multi-core processor, and wherein execution time is reserved on the fix execution unit according to estimated execution times of all micro tasks $muT_{xi}$ of all real-time tasks $T_x$ allocated to the fix execution unit, wherein reserving is done by a scheduler which is an OS scheduler.

9. The method according to an claim 8, wherein the budget $B_{WCETx}$ of task $T_x$ is the planned activation budget $B_{WCETx1}$ of the initial micro task $muT_{x1}$ of task $T_x$, wherein a plurality of tasks may be allocated on a same execution unit as long as the following constraints are met:

the sum of estimated execution times for the hard real-time micro tasks of each task of the plurality of tasks does not exceed a first portion of a maximum utilization of the execution unit during the planning period; and the sum of the budgets of real-time tasks allocated to the same execution unit does not exceed a certain second portion of the maximum utilization of the execution unit during the planning period.

10. The method according to claim 8, wherein, if a difference between an actual activation time of micro task $muT_{xi}$ and a planned activation time of micro task $muT_{xi}$ is negative, a portion of the execution time within the planning period reserved on the execution unit for execution of task $T_x$ with real-time constraints is released and thus available for executing other tasks during the planning period, wherein the planned activation time of micro task $muT_{xi}$ is the micro deadline $muD_{xi-1}$ of the preceding micro task $muT_{xi-1}$, and wherein the amount of released time is lower or equal to a difference between the actual time remaining until the deadline of $T_x$ and the planned activation budget $BW_{CETXi}$.

11. An apparatus for executing a program including a plurality of tasks, wherein one or more tasks of the plurality of tasks have real-time constraints, the apparatus comprising the following hardware units:

a processor for executing the plurality of tasks;

memory to store a real-time reference model, wherein the real-time reference model of task $T_x$ includes a plurality of micro tasks $muT_{xi}$, i where i belongs to integer set $\{1, \ldots, n\}$ which are a partitioning of task $T_x$, and an order among the micro tasks $muT_{xi}$ according to all possible execution paths of task $T_x$, wherein, for each micro task $muT_{xi}$, i where i belongs to integer set $\{1, \ldots, n\}$, a micro budget $muB_{xi}$ which is smaller than the worst case execution time, WCET, of micro task $muT_{xi}$ determined;

wherein the micro budget $muB_{xi}$ specifies an execution time to complete execution of micro task $muT_{xi}$ with a probability lower than 100% and above a predetermined probability threshold, and wherein the micro budget $muB_{xi}$ of a micro task $muT_{xi}$ is determined on the basis of static analysis and/or abstract interpretation of a program of $muT_{xi}$ and/or statistical analysis of executions of $muT_{xi}$; and wherein, for each micro task $muT_{xi}$, i where i belongs to integer set $\{1, \ldots, n\}$, based on the micro budgets $muB_{xk}$, k where k belongs to integer set $\{1, \ldots, n\}$, a reference timing is determined that specifies an estimated timing of micro task $muT_{xi}$ in any possible execution of task $T_x$, such that all possible continuations of executions of task $T_x$ from micro task $muT_{xi}$ onward meet the real-time constraints of task $T_x$ with a probability above a tolerance boundary, wherein the real-time constraints of task $T_x$ are met with a probability above the tolerance boundary if the execution of task $T_x$ completes before a deadline of task $T_x$ with a probability lower than 100% and above a certain minimum service guarantee;

wherein the reference timing of micro task $muT_{xi}$ includes a micro deadline $muD_{xi}$, which specifies a response time up to which an execution of micro task $muT_{xi}$ should be finished, wherein the response time is a duration relative to an activation time $ATT_x$ of the task $T_x$;

wherein the micro task $muT_{xi}$ should be finished until each of the micro tasks $muT_{xk}$ k where k belongs to integer set $\{1, \ldots, i\}$ on a critical path from an initial micro task $muT_{x1}$ to a micro task $muT_{xi}$ has finished execution, wherein the execution time of each micro task $muT_{xk}$ is estimated by its micro budget $muB_{xk}$;

wherein the real-time constraints of task $T_x$ are not met with a probability above the tolerance boundary if the actual timing at the end of micro task $muT_{xi}$ exceeds the time by which micro task $muT_{xi}$ should have been finished; and wherein the critical path to micro task $muT_{xi}$ is a path among all possible execution paths of $T_x$ from the initial micro task $muT_{x1}$ to micro task $muT_{xi}$ which has the longest predicted execution time;

an event monitoring unit adapted to determine after execution of micro task $muT_{xi}$ an actual timing;

a budget time monitoring unit adapted to compare the actual timing to the reference timing; and a hardware scheduling unit adapted to increase the priority of task $T_x$ based on a comparison result of the budget time monitoring unit, if it is determined that the real-time constraints of task $T_x$ are not met with a probability above the tolerance boundary.

12. The apparatus according to claim 11 further comprising:

a calibration unit adapted to carry out execution time measurements of a micro task and, based on the measurements, to determine information about the execution time of the micro task, and to store the information in the real-time reference model.

13. The apparatus according to claim 11, wherein the event monitoring unit is further adapted to maintain, for each real-time task $T_x$, a most recently emitted trace event $E_{xi}$ including a point in time $CT_{EXi}$ when the trace event $E_{xi}$ was emitted;

wherein the apparatus further comprises a deadline monitoring unit adapted to determine a difference $deltaS_{muTxi} = CT_{Exi-1} - muD_{xi-1}$ between an actual activation time $CT_{Exi-1}$ of micro task $muT_{xi}$ and a planned activation time of micro task $muT_{xi}$, and/or to detect if an execution of a micro task $muT_{xi}$ finishes after micro deadline $muD_{xi}$;

wherein the budget time monitoring unit is further adapted to determine, for each real-time task $T_x$, a deviation between a planned timing of task $T_x$ and an actual timing of task $T_x$, wherein the planned timing of task $T_x$ before execution of micro task $muT_{xi}$ is the planned activation budget $B_{WCETxi}$, and wherein the actual timing of task $T_x$ is estimated based on an amount of CPU time used by task $T_x$ up to the response time $CT_{Exi-1}$ and the difference deltaS muTxi; and wherein the hardware scheduling unit is further adapted generate a real-time control value for a real-time task $T_x$ based on a deviation of the planned timing of $T_x$ from the actual timing of task $T_x$, and wherein the real-time control value is signaled to an OS scheduler.

* * * * *